(12) United States Patent
Eierhoff et al.

(10) Patent No.: US 11,299,647 B2
(45) Date of Patent: *Apr. 12, 2022

(54) AQUEOUS COLOR PIGMENT PASTES CONTAINING A POLYMERIZATE, AND BASECOATS PRODUCED THEREFROM

(71) Applicant: BASF Coatings GmbH, Muenster (DE)

(72) Inventors: Dirk Eierhoff, Muenster (DE); Joerg Schwarz, Muenster (DE); Stephan Schwarte, Muenster (DE); Cathrin Corten, Muenster (DE)

(73) Assignee: BASF Coatings GmbH, Muenster (DE)

( * ) Notice: Subject to any disclaimer, the term of this patent is extended or adjusted under 35 U.S.C. 154(b) by 206 days.

This patent is subject to a terminal disclaimer.

(21) Appl. No.: 16/496,890

(22) PCT Filed: Mar. 22, 2018

(86) PCT No.: PCT/EP2018/057343
§ 371 (c)(1),
(2) Date: Dec. 24, 2019

(87) PCT Pub. No.: WO2018/172476
PCT Pub. Date: Sep. 27, 2018

(65) Prior Publication Data
US 2020/0140713 A1  May 7, 2020

(30) Foreign Application Priority Data

Mar. 23, 2017 (EP) .................................. 17162525

(51) Int. Cl.
| | |
|---|---|
| *C09D 17/00* | (2006.01) |
| *C09D 5/02* | (2006.01) |
| *C08F 2/00* | (2006.01) |
| *C08F 2/22* | (2006.01) |
| *C08F 220/06* | (2006.01) |
| *C08F 220/18* | (2006.01) |
| *C08F 220/28* | (2006.01) |
| *C08F 212/08* | (2006.01) |
| *B05D 7/14* | (2006.01) |
| *B05D 7/00* | (2006.01) |

(52) U.S. Cl.
CPC ............ *C09D 17/001* (2013.01); *C08F 2/001* (2013.01); *C08F 2/22* (2013.01); *C08F 212/08* (2013.01); *C08F 220/06* (2013.01); *C08F 220/18* (2013.01); *C08F 220/28* (2013.01); *C09D 5/027* (2013.01); *C09D 17/008* (2013.01); *B05D 7/14* (2013.01); *B05D 7/532* (2013.01); *B05D 2451/00* (2013.01)

(58) Field of Classification Search
CPC .... C09D 5/027; C09D 17/001; C09D 17/008; C08F 2/001; C08F 2/22
See application file for complete search history.

(56) References Cited

U.S. PATENT DOCUMENTS

| | | | |
|---|---|---|---|
| 3,862,071 A | 1/1975 | Di Carlo | |
| 2005/0002027 A1 | 1/2005 | Sierakowski et al. | |
| 2019/0062588 A1 | 2/2019 | Corten et al. | |

FOREIGN PATENT DOCUMENTS

| | | | |
|---|---|---|---|
| CN | 109476816 A | 3/2019 | |
| DE | 4009858 A1 | 10/1991 | |
| DE | 4437535 A1 | 4/1996 | |
| DE | 19948004 A1 | 7/2001 | |
| EP | 228003 B2 | 3/1994 | |
| EP | 438090 B1 | 4/1994 | |
| EP | 634431 A1 | 1/1995 | |
| EP | 960174 B1 | 4/2002 | |
| EP | 1448730 B1 | 3/2010 | |
| WO | 1991015528 A1 | 10/1991 | |
| WO | 1992015405 A1 | 9/1992 | |
| WO | 2010063599 A1 | 6/2010 | |
| WO | 2014033135 A2 | 3/2014 | |
| WO | 2015090811 A1 | 6/2015 | |
| WO | 2016116299 A1 | 7/2016 | |
| WO | WO-2016116299 A1 * | 7/2016 | ............ C08F 265/06 |
| WO | 2017088988 A2 | 6/2017 | |

OTHER PUBLICATIONS

International Search Report and Written Opinion for International Application No. PCT/EP2018/057343, dated Aug. 13, 2018 (13 pages).

* cited by examiner

*Primary Examiner* — Vu A Nguyen
(74) *Attorney, Agent, or Firm* — Armstrong Teasdale LLP

(57) ABSTRACT

Described herein are an aqueous pigment paste including at least one color pigment (a) and at least one polymer (b) which is preparable by successive radical emulsion polymerization of three monomer mixtures (A), (B) and (C) of olefinically unsaturated monomers in water, an aqueous basecoat material which is preparable by admixing the pigment paste to at least one aqueous binder-containing component suitable for preparing the basecoat material, a method for producing a multicoat paint system using this basecoat material, and use of the polymer (b) for dispersing color pigments within an aqueous pigment paste.

15 Claims, No Drawings

AQUEOUS COLOR PIGMENT PASTES CONTAINING A POLYMERIZATE, AND BASECOATS PRODUCED THEREFROM

CROSS-REFERENCE TO RELATED APPLICATIONS

This application is the national stage entry of PCT/EP2018/057343, filed on Mar. 22, 2018, which claims the benefit of priority to European Patent Application No. 17162525.4, filed Mar. 23, 2017, each of which is incorporated by reference in its entirety herein.

FIELD OF THE INVENTION

The present invention relates to an aqueous pigment paste comprising at least one color pigment (a) and at least one polymer (b) which is preparable by successive radical emulsion polymerization of three monomer mixtures (A), (B) and (C) of olefinically unsaturated monomers in water, to an aqueous basecoat material which is preparable by admixing the pigment paste to at least one aqueous binder-containing component suitable for preparing the basecoat material, to a method for producing a multicoat paint system using this basecoat material, and to use of the polymer (b) for dispersing color pigments within an aqueous pigment paste.

BACKGROUND

Pigment pastes and polymers used therein are known in the art. The use of pigment pastes in the coatings industry substantially facilitates the technically complex operation of pigment dispersing, since it ensures, for example, dust-free processing of pigments during the formulation of coating materials. As a result of incorporation into the paste, moreover, the pigments are optimally wetted and very well dispersed, and so an improved state of distribution is achieved in the resultant coating material as well. This results in improved technological performance properties on the part of the coating material and of the paint system produced therefrom, such as particularly homogeneous color or color distribution on the part of the paint system. Pigment pastes are for these reasons initially produced separately as an intermediate before being incorporated into a coating material such as a waterborne basecoat material.

In the production of pigment pastes, precisely tailored polymers must be used as paste binders in order to obtain an optimally conditioned paste. Without individual adaptation and precise selection of the polymer, the pigment in question can usually not be optimally dispersed, and so, therefore, the technological performance properties of the ultimately resulting paint system are also not optimal.

Another problem here, often, is that the paste binder in question does not always correspond to the principal binder of the coating composition, and so the paste introduces a further binder component into the coating composition. As a result, the operation of producing the coating composition becomes more complex. Moreover, there is a loss of formulating freedom in the production of a coating material. The reason is that the use of a particular polymer in the paste may mean that other coating components in turn also have to be tailored to this polymer. Furthermore, there is less room for maneuver in the use of further additives and/or binder components in the coating, since their use may excessively lower, in particular, the fraction of the principal binder, which is of primary importance. If attempts are made to compensate the above disadvantages in formulation freedom by using a polymer (paste binder) in the paste that corresponds to the principal binder in the resulting coating composition, there are generally compromises that have to be made in terms of the choice of the principal binder and hence in the quality of the resultant coating composition and of the multicoat paint system produced with it—such compromises, however, are undesirable.

From an environmental standpoint, furthermore, it is desirable to use pigment pastes which are aqueous or have as low a level as possible of organic solvents.

Known from WO 2015/090811 A1 are aqueous pigment pastes which as well as a pigment comprise a polyurethane-based copolymer which is preparable by copolymerizing a mixture of olefinically unsaturated monomers in the presence of a polyurethane. Following incorporation into a coating composition such as a waterborne basecoat material, however, the pigment pastes disclosed in WO 2015/090811 A1 do not always lead to the desired pinhole robustness.

In the prior art, furthermore, there are pigment pastes known which comprise for example polyesters and/or polyurethanes and also often comparatively large amounts of organic solvents. Disadvantages of these pigment pastes, however, are their low storage stability and also their comparatively high solvent content and binder content. Moreover, coating compositions, especially basecoat materials, into which such pigment pastes have been incorporated, and coatings obtained from such coating compositions, often lack sufficient properties in relation, in particular, to hiding power, storage stability, formation of specks, separation tendency, incidence of pops and/or runs, and pinhole robustness. Polyurethane-containing pigment pastes are known for example from EP 1 448 730 B1, EP 0 960 174 B1, and WO 91/15528 A1. Pigment pastes containing polyester polyurethane are known for example from EP 0 438 090 B1.

There is therefore a need for aqueous pigment pastes which do not have the disadvantages identified above.

One problem addressed by the present invention, therefore, is that of providing an aqueous pigment paste which can be used for producing a basecoat material and has advantages over the pigment pastes known from the prior art. A particular problem addressed by the present invention is that of providing an aqueous pigment paste which comprises as paste binder a polymer which can be used equally as principal binder in corresponding aqueous basecoat materials to be produced using the pigment paste. The aqueous basecoat materials produced accordingly ought to provide optimum fulfilment of the requisite technological performance properties, such as especially a good visual appearance and hiding power, at any rate not detracting from these properties even if not actually being able to improve them.

DETAILED DESCRIPTION

This problem is solved by the subject matter claimed in the claims and also by the preferred embodiments of that subject matter that are described in the description hereinafter.

A first subject of the present invention is therefore an aqueous pigment paste comprising
(a) at least one color pigment and
(b) at least one polymer having an average particle size in the range from 100 to 500 nm, preparable by successive radical emulsion polymerization of three monomer mixtures (A), (B) and
(C) of olefinically unsaturated monomers in water, where
the mixture (A) comprises at least 50 wt % of monomers having a solubility in water of less than 0.5 g/l at 25°

C., and a polymer prepared from the mixture (A) possesses a glass transition temperature of 10 to 65° C., the mixture (B) comprises at least one polyunsaturated monomer, and a polymer prepared from the mixture (B) possesses a glass transition temperature of −35 to 15° C., and a polymer prepared from the mixture (C) possesses a glass transition temperature of −50 to 15° C., and where
i. first the mixture (A) is polymerized,
ii. then the mixture (B) is polymerized in the presence of the polymer prepared under i., and
iii. thereafter the mixture (C) is polymerized in the presence of the polymer prepared under ii.

A further subject of the present invention is an aqueous basecoat material, wherein the basecoat material is preparable by admixing at least one pigment paste of the invention as component (1) to at least one aqueous component (2) which is suitable for preparing a basecoat material and which comprises at least one polymer which can be used as binder, this polymer which can be used as binder comprising the polymer (b) also present in the pigment paste, and/or comprising at least one polymer different therefrom. As is evident from the results of the experiments described in section 5.5 and table 5.13 of the experimental section hereinafter, this specific production of basecoat materials with the same composition but produced in different ways distinguishes the basecoat materials of the invention in terms of their properties such as, for example, with respect to long wave (LW) and DOI, i.e., with respect to their appearance, in the determination of the film thickness dependent profile.

A further subject of the present invention is a method for producing a multicoat paint system, by
(1a) applying an aqueous basecoat material to a substrate,
(2a) forming a polymer film from the coating material applied in stage (1a),
(1b) optionally applying a further aqueous basecoat material to the polymer film thus formed,
(2b) optionally forming a polymer film from the coating material applied in stage (1b),
(3) applying a clearcoat material to the resultant basecoat film(s), and subsequently
(4) jointly curing the basecoat film(s) together with the clearcoat film,
wherein a basecoat material of the invention is used in stage (1a) or—if the method further comprises stages (1b) and (2b)—in stage (1a) and/or (1b). The substrate used in stage (1a) preferably has an electrocoat film (EC), more preferably an electrocoat film applied by cathodic deposition of an electrocoat material, and the basecoat material used in stage (1a) is applied directly to the EC-coated substrate, the electrocoat film (EC) applied to the substrate being preferably cured during implementation of stage (1a).

A further subject of the present invention is a use of the polymer identified in connection with the first subject, i.e., of a polymer having an average particle size in the range from 100 to 500 nm, preparable by successive radical emulsion polymerization of three monomer mixtures (A), (B) and (C) of olefinically unsaturated monomers in water, where the mixture (A) comprises at least 50 wt % of monomers having a solubility in water of less than 0.5 g/l at 25° C., and a polymer prepared from the mixture (A) possesses a glass transition temperature of 10 to 65° C., the mixture (B) comprises at least one polyunsaturated monomer, and a polymer prepared from the mixture (B) possesses a glass transition temperature of −35 to 15° C., and a polymer prepared from the mixture (C) possesses a glass transition temperature of −50 to 15° C., and where
i. first the mixture (A) is polymerized,
ii. then the mixture (B) is polymerized in the presence of the polymer prepared under i., and
iii. thereafter the mixture (C) is polymerized in the presence of the polymer prepared under ii,
for dispersing color pigments within an aqueous pigment paste.

It has surprisingly been found that the polymer (b) present in the aqueous pigment paste of the invention not only can be used as a principal binder in aqueous basecoat materials but also, furthermore, can be used as a paste binder in an aqueous pigment paste. As a result, enhanced formulation freedom is acquired in the production of the basecoat material, since, as a result of the possibility now provided for the polymer (b) to be used in the pigment paste, there is no need for the other coating components of the basecoat material to be brought into line with a further paste binder different from the polymer (b). Moreover, there is consequently greater room for maneuver in the use of further additives and/or binder components in the basecoat material, since the use of the polymer (b) in the pigment paste as well means that in these cases the fraction of the principal binder of the basecoat material is not excessively lowered. It has in particular been surprisingly found that in spite of the use of the polymer (b) both as paste binder in the pigment paste and as principal binder of the resultant basecoat material, there are no disadvantages in the quality of the resultant coating composition and of the multicoat paint systems produced therewith, in terms, for example, of technological performance properties such as a good visual appearance (incidence of pops and runs and also pinholes and specks), and in terms of the hiding power.

DETAILED DESCRIPTION

The term "comprising" in the sense of the present invention, in connection with the pigment paste of the invention and also in connection with the basecoat material of the invention, preferably has the meaning of "consisting of". In this case it is possible, both for the pigment paste of the invention—besides components (a), (b) and water—and for the basecoat material of the invention—besides components (1), (2) and water—for one or more of the further components stated below and present optionally in the pigment paste of the invention and/or in the basecoat material of the invention to be present in said paste and/or said material. All of these components may each be present in their preferred embodiments as stated below.

Pigment Paste of the Invention

The pigment paste of the invention is a color pigment paste, owing to the presence of the at least one color pigment (a). The concept of the pigment paste is known to the skilled person and is defined for example in Römpp Lexikon, Lacke and Druckfarben, Georg Thieme Verlag, 1998, 10th edition, page 452: Pigment pastes are preparations of pigment mixtures in carrier materials such as polymers, comprising the pigments at a concentration higher than that of the subsequent application. The subsequent application of pigment pastes lies in general in the production of coating compositions such as basecoat materials. A pigment paste is therefore distinguished from a coating composition such as a basecoat material in that it represents only a precursor to the production of such a coating composition. A pigment paste as such can therefore not itself be used as basecoat material. In pigment pastes, customarily, the relative weight ratio of pigments to polymers is greater than in the coating compositions for whose production the paste is eventually used. Besides the carrier materials such as polymers, also called paste binders, and pigments, the pigment paste customarily comprises water and/or organic solvents as well. Various additives such as wetting agents and/or thickeners may also be used in a pigment paste. The polymer (b) present in the pigment paste of the invention is used as a pigment paste binder (paste binder). The pigment paste of the invention represents an aqueous composition comprising components (a) and (b).

The pigment paste of the invention is aqueous. It preferably comprises a system whose solvent contains mainly water, preferably in an amount of at least 25 wt %, and organic solvents in lower fractions, preferably in an amount of <25 wt %, based in each case on the total weight of the pigment paste of the invention.

The pigment paste of the invention preferably comprises a water fraction of at least 25 wt %, more preferably at least 30 wt %, very preferably of at least 35 wt %, more particularly of at least 40 wt %, most preferably of at least 42.5 wt %, based in each case on the total weight of the pigment paste.

The pigment paste of the invention preferably comprises a water fraction which is in a range from 25 to 75 wt %, more preferably in a range from 30 to 70 wt %, very preferably in a range from 35 to 65 wt % or to 60 wt % or to 55 wt %, based in each case on the total weight of the pigment paste.

The pigment paste of the invention preferably comprises an organic solvent fraction which is in a range of <25 wt %, more preferably in a range from 0 to <25 wt %, very preferably in a range of 0.5 to 25 wt % or to 15 wt % or to 10 wt %, based in each case on the total weight of the pigment paste.

The solids content of the pigment paste of the invention is preferably in a range from 15 to 70 wt %, more preferably of 17.5 to 65 wt %, especially preferably of 20 to 60 wt %, more particularly of 22.5 to 55 wt %, most preferably of 25 to wt % or of 30 to 50 wt %, based in each case on the total weight of the pigment paste. The solids content, i.e., the nonvolatile fraction, is determined in accordance with the invention described hereinafter.

The percentage sum of the solids contents of the pigment paste of the invention and the water fraction in the pigment paste of the invention is preferably at least 70 wt %, more preferably at least 80 wt %. Preferred in turn are ranges of 70 to 99 wt %, especially 75 or 80 to 97.5 wt %. If, for example, a pigment paste of the invention has a solids content of 30 wt % and a water content of 65 wt %, the above-defined percentage sum of the solids content and the water fraction is 95 wt %.

The pigment paste of the invention preferably comprises a polymer (b) fraction in a range from 1.0 to 25 wt %, more preferably from 1.5 to 20 wt %, very preferably from 2.0 to 17.5 wt %, more particularly from 2.5 to 15 wt %, most preferably from 4.0 to 12.5 wt %, based in each case on the total weight of the pigment paste. The fraction of the polymer (b) in the pigment paste may be determined or specified via the determination of the solids content (also called nonvolatile fraction or solids fraction) of an aqueous dispersion comprising the polymer (b) and used in producing the pigment paste.

The pigment paste of the invention comprises a color pigment (a) fraction of at least 5 wt %, preferably of at least 7.5 or 10 wt %, more preferably of at least 12.5 or 15 wt %, very preferably of at least 17.5 wt %, more particularly of at least 20 or 22.5 or 25 or 27.5 wt %, most preferably of at least 30 wt %, based in each case on the total weight of the pigment paste, in particular when the color pigment (a) is a white pigment such as titanium dioxide.

The pigment paste of the invention preferably comprises a color pigment (a) fraction in a range from 5 to 75 wt %, more preferably from 7.5 to 70 wt %, very preferably from 10 to 65 wt %, more particularly from 15 to 60 wt %, most preferably from 17.5 to 55 wt % or from 20 to 50 wt %, based in each case on the total weight of the pigment paste, in particular when the color pigment (a) is a white pigment such as titanium dioxide.

The relative weight ratio of the at least one color pigment (a) to the polymer (b) in the pigment paste is preferably at least 1:1 or at least 1.2:1 or at least 1.5:1 or higher in each case, more preferably at least 2.0:1 or higher, very preferably at least 2.5:1 or higher, more particularly at least 3.0:1 or higher.

The relative weight ratio of the at least one color pigment (a) to the polymer (b) in the pigment paste is preferably in a range from 15:1 to 1:15, more preferably in a range from 10:1 to 1:10, very preferably in a range from 8:1 to 1:8. In particular when the at least one color pigment (a) is a white pigment such as titanium dioxide, the relative weight ratio of the at least one color pigment (a) to the polymer (b) in the pigment paste is preferably in a range from 10:1 to 1:1 or from 10:1 to 1.2:1 or from 10:1 to 1.5:1, more preferably in a range from 8:1 to 1.2:1 or from 8:1 to 1.5:1, most preferably in a range from 8:1 to 1.7:1 or from 8:1 to 2.0:1, more particularly in a range from 8:1 to 2.2:1 or from 8:1 to 2.5:1.

The fractions in weight percent of all of the components present in the pigment paste of the invention, vis components (a), (b), and water, and also further components optionally present additionally, add up to 100 wt %, based on the total weight of the pigment paste.

Color Pigment (a)

The pigment paste of the invention comprises at least one color pigment as component (a), preferably in an amount of at least 5 wt %, based on the total weight of the pigment paste.

A skilled person is familiar with the concept of the color pigments. For the purposes of the present invention, the terms "coloring pigment" and "color pigment" are interchangeable. A corresponding definition of the pigments, and further particularizations thereof, is governed in DIN 55943 (date: October 2001). Color pigments (a) used can be organic and/or inorganic pigments. The color pigment (a) is preferably an inorganic color pigment. Particularly preferred color pigments (a) used are white pigments, chromatic pigments and/or black pigments. White pigments are most preferable in this case. Examples of white pigments are titanium dioxide, zinc white, zinc sulfide, and lithopone. Examples of black pigments are carbon black, iron manganese black, and spinel black. Examples of chromatic pigments are chromium oxide, chromium oxide hydrate green, cobalt green, ultramarine green, cobalt blue, ultramarine blue, manganese blue, ultramarine violet, cobalt violet and manganese violet, red iron oxide, cadmium sulfoselenide, molybdate red and ultramarine red, brown iron oxide, mixed brown, spinel phases and corundum phases, and chromium orange, yellow iron oxide, nickel titanium yellow, chromium titanium yellow, cadmium sulfide, cadmium zinc sulfide, chromium yellow, and bismuth vanadate.

The pigment paste of the invention may optionally comprise further pigments different from the at least one color pigment (a), more particularly effect pigments and/or fillers.

Preferably, however, the pigment paste of the invention contains no such further pigment such as an effect pigment and also no filler.

Polymer (b)

The pigment paste of the invention comprises at least one polymer (b) having an average particle size in the range from 100 to 500 nm, preparable by successive radical emulsion polymerization of three monomer mixtures (A), (B) and (C) of olefinically unsaturated monomers in water, where the mixture (A) comprises at least 50 wt % of monomers having a solubility in water of less than 0.5 g/l at 25° C., and a polymer prepared from the mixture (A) possesses a glass transition temperature of 10 to 65° C., the mixture (B) comprises at least one polyunsaturated monomer, and a polymer prepared from the mixture (B) possesses a glass transition temperature of −35 to 15° C., and a polymer prepared from the mixture (C) possesses a glass transition temperature of −50 to 15° C., and where i. first the mixture (A) is polymerized, ii. then the mixture (B) is polymerized in the presence of the polymer prepared under i., and iii. thereafter the mixture (C) is polymerized in the presence of the polymer prepared under ii.

The polymers (b) represent what are called seed-core-shell polymers (SCS polymers). Polymers (b) and aqueous dispersions comprising such polymers are known for example from WO 2016/116299 A1. The polymer (b) is preferably a (meth)acrylic copolymer.

The polymer (b) present in the pigment paste of the invention is used as a pigment paste binder (paste binder). The term "binder" in the sense of the present invention, in agreement with DIN EN ISO 4618 (German version, date: March 2007), refers preferably to those nonvolatile fractions of a composition that are responsible for film formation, such as of the pigment paste of the invention or of the basecoat material of the invention, apart from the pigments present therein, such as the at least one color pigment (a) and other pigments and/or fillers optionally present. The nonvolatile fraction may be determined by a method described hereinafter. A binder constituent, accordingly, is a particular component which contributes to the binder content of a composition such as the pigment paste of the invention or the basecoat material of the invention. An example would be a basecoat material comprising the polymer (b), a crosslinking agent such as a melamine resin and/or a free or blocked polyisocyanate and/or a polymeric additive.

The polymer (b) is used preferably in the form of an aqueous dispersion for producing the pigment paste of the invention.

The preparation of the polymer (b) comprises the successive radical emulsion polymerization of three mixtures (A), (B) and (C) of olefinically unsaturated monomers in each case in water. It is therefore a multistage radical emulsion polymerization where i. first the mixture (A) is polymerized, then ii. the mixture (B) is polymerized in the presence of the polymer prepared under i. and, furthermore, iii. the mixture (C) is polymerized in the presence of the polymer prepared under ii. All three monomer mixtures are therefore polymerized by a radical emulsion polymerization (i.e. stage or else polymerization stage), carried out separately in each case, with these stages taking place successively. In terms of time, the stages may take place immediately after one another. It is equally possible, after the end of one stage, for the reaction solution in question to be stored for a certain period and/or transferred to a different reaction vessel, and only then for the next stage to be carried out. The preparation of the polymer (b) preferably comprises no polymerization steps other than the polymerization of the monomer mixtures (A), (B) and (C).

The concept of radical emulsion polymerization is one known to the skilled person, and is elucidated in more detail hereinafter, moreover. In the polymerization, olefinically unsaturated monomers are polymerized in an aqueous medium, preferably with use of at least one water-soluble initiator and in the presence of at least one emulsifier. Corresponding water-soluble initiators are likewise known. The at least one water-soluble initiator is preferably selected from the group consisting of potassium, sodium or ammonium peroxodisulfate, hydrogen peroxide, tert-butyl hydroperoxide, 2,2'-azobis(2-amidoisopropane) dihydrochloride, 2,2'-azobis(N,N'-dimethyleneisobutyramidine) dihydrochloride, 2,2'-azobis(4-cyanopentanoic acid), and mixtures of the aforesaid initiators, such as hydrogen peroxide and sodium persulfate, for example. Likewise members of the preferred group stated are the redox initiator systems, which are known per se. Redox initiator systems are, in particular, those initiators which comprise at least one peroxide-containing compound in combination with at least one redox coinitiator, examples being reductive sulfur compounds such as, for example, bisulfites, sulfites, thiosulfates, dithionites or tetrathionites of alkali metals and ammonium compounds, sodium hydroxymethanesulfinate dihydrate and/or thiourea. Hence it is possible to use combinations of peroxodisulfates with alkali metal hydrogensulfites or ammonium hydrogensulfites, examples being ammonium peroxydisulfate and ammonium disulfite. The weight ratio of peroxide-containing compounds to the redox coinitiators is preferably 50:1 to 0.05:1.

In combination with the initiators it is possible additionally to use transition metal catalysts, such as, for example, iron, nickel, cobalt, manganese, copper, vanadium or chromium salts, such as iron(II) sulfate, cobalt(II) chloride, nickel(II) sulfate, copper(I) chloride, manganese(II) acetate, vanadium(III) acetate, manganese(II) chloride. Based on the total mass of the olefinically unsaturated monomers used in a polymerization, these transition metal salts are employed customarily in amounts of 0.1 to 1000 ppm. Hence it is possible to use combinations of hydrogen peroxide with iron(II) salts, such as, for example, 0.5 to 30 wt % of hydrogen peroxide and 0.1 to 500 ppm of Mohr's salt, the fractional ranges being based in each case on the total weight of the monomers used in the respective polymerization stage. The initiators are used preferably in an amount of 0.05 to 20 wt %, preferably 0.05 to 10, more preferably of 0.1 to 5 wt %, based on the total weight of the monomers used in the respective polymerization stage.

An emulsion polymerization proceeds within a reaction medium that comprises water as continuous medium and, in addition, preferably at least one emulsifier, preferably in the form of micelles. The polymerization is started by decomposition of the water-soluble initiator in the water. The growing polymer chain is incorporated into the emulsifier micelles, and the further polymerization then takes place within the micelles. As well as the monomers, the at least one water-soluble initiator, and the at least one emulsifier, therefore, the reaction mixture consists primarily of water. The stated components—that is, monomers, water-soluble initiator, emulsifier, and water—make up preferably at least 95 wt % of the reaction mixture. The reaction mixture preferably consists of these components. The at least one emulsifier is used preferably in an amount of 0.1-10 wt %, more preferably 0.1-5 wt %, very preferably 0.1-3 wt %, based in each case on the total weight of the monomers used in the respective polymerization stage. Emulsifiers as well are known in principle. Those used may be nonionic or ionic emulsifiers, including zwitterionics, and optionally, also, mixtures of the aforesaid emulsifiers. Preferred emulsifiers are optionally ethoxylated and/or propoxylated alkanols having 10 to 40 carbon atoms. They may have different degrees of ethoxylation and/or propoxylation (examples being adducts modified with poly(oxy)ethylene and/or poly(oxy)propylene chains consisting of 5 to 50 molecular units). Sulfated, sulfonated or phosphated derivatives of the stated products may also be used. Such derivatives are generally employed in neutralized form. Particularly preferred emulsifiers are neutralized dialkylsulfosuccinic esters or alkyldiphenyl oxide disulfonates, suitably, available commercially for example as EF-800 from Cytec. The emulsion polymerizations are carried out judiciously at a temperature of 0 to 160° C., preferably of 15 to 95° C., more preferably 60 to 95° C. This operation takes place preferably in the absence of oxygen, preferably under an inert gas atmosphere. In general the polymerization is carried out at atmospheric pressure, although the use of lower pressures or higher pressures is also possible. Particularly if polymerization temperatures are employed that lie above the boiling point of water, the monomers used and/or the organic solvents under atmospheric pressure, higher pressures are generally selected.

The individual polymerization stages in the preparation of the polymer (b) may be carried out, for example, as what are called "starved feed" polymerizations (also known as "starve feed" or "starve fed" polymerizations). A starved feed polymerization in the sense of the present invention is an emulsion polymerization in which the amount of free olefinically unsaturated monomers in the reaction solution (also called reaction mixture) is minimized throughout the reaction time. This means that the metered addition of the olefinically unsaturated monomers is such that over the entire reaction time the fraction of free monomers in the reaction solution does not exceed 6.0 wt %, preferably 5.0 wt %, more preferably 4.0 wt %, particularly advantageously 3.5 wt %, based in each case on the total amount of the monomers used in the respective polymerization stage. Further preferred within these strictures are concentration ranges for the olefinically unsaturated monomers of 0.01 to 6.0 wt %, preferably 0.02 to 5.0 wt %, more preferably 0.03 to 4.0 wt %, more particularly 0.05 to 3.5 wt %. For example, the highest weight fraction detectable during the reaction may be 0.5 wt %, 1.0 wt %, 1.5 wt %, 2.0 wt %, 2.5 wt % or 3.0 wt %, while all other values detected then lie below the values indicated here. The total amount (also called total weight) of the monomers used in the respective polymerization stage evidently corresponds for stage i. to the total amount of the monomer mixture (A), for stage ii. to the total amount of the monomer mixture (B), and for stage iii. to the total amount of the monomer mixture (C). The concentration of the monomers in the reaction solution here may be determined by gas chromatography, for example. In that case a sample of the reaction solution is cooled with liquid nitrogen immediately after sampling, and 4-methoxyphenol is added as an inhibitor. In the next step, the sample is dissolved in tetrahydrofuran and then n-pentane is added in order to precipitate the polymer formed at the time of sampling. The liquid phase (supernatant) is then analyzed by gas chromatography, using a polar column and an apolar column for determining the monomers, and using a flame ionization detector. Typical parameters for the gas-chromatographic determination are as follows: 25 m silica capillary column with 5% phenyl-, 1% vinyl-methylpolysiloxane phase or 30 m silica capillary column with 50% phenol- and 50% methyl-polysiloxane phase, carrier gas hydrogen, split injector 150° C., oven temperature 50 to 180° C., flame ionization detector, detector temperature 275° C., internal standard isobutyl acrylate. The concentration of the monomers for the purposes of the present invention is determined preferably by gas chromatography, more particularly in compliance with the parameters specified above.

The fraction of the free monomers may be controlled in various ways. One possibility for keeping the fraction of the free monomers low is to select a very low metering rate for the mixture of the olefinically unsaturated monomers into the actual reaction solution, in which the monomers make contact with the initiator. If the metering rate is so low that all of the monomers are able to react virtually immediately when they are in the reaction solution, it is possible to ensure that the fraction of the free monomers is minimized. In addition to the metering rate, it is important that there are always sufficient radicals present in the reaction solution to allow each of the added monomers to react extremely quickly. In this way, further chain growth of the polymer is guaranteed, and the fraction of free monomer is kept low. For this purpose, the reaction conditions are preferably selected such that the initiator feed is commenced even before the start of the metering of the olefinically unsaturated monomers. The metering is preferably commenced at least 5 minutes beforehand, more preferably at least 10 minutes beforehand. With preference at least 10 wt % of the initiator, more preferably at least 20 wt %, very preferably at least 30 wt % of the initiator, based in each case on the total amount of initiator, is added before the metering of the olefinically unsaturated monomers is commenced. Preference is given to selecting a temperature which allows constant decomposition of the initiator. The amount of initiator is likewise an important factor in the sufficient presence of radicals in the reaction solution. The amount of initiator should be selected such that at any time there are sufficient radicals available to allow the added monomers to react. If the amount of initiator is increased, greater amounts of monomers can be reacted at the same time.

A further factor determining the reaction rate is the reactivity of the monomers. Control over the fraction of the free monomers may therefore be guided by the interplay of initiator quantity, rate of initiator addition, rate of monomer addition, and through selection of the monomers. Not only a slowing-down of metering but also an increase in the initiator quantity, and also the premature commencement of addition of the initiator, serve the aim of keeping the concentration of free monomers below the limits stated above. At any point during the reaction, the concentration of free monomers can be determined by gas chromatography, as described above. Should this analysis find a concentration of free monomers that comes close to the limiting value for the starved feed polymerization, as a result, for example, of small fractions of highly reactive olefinically unsaturated monomers, the parameters referred to above can be utilized in order to control the reaction. In this case, for example, the metering rate of the monomers can be lowered, or the amount of initiator can be increased.

For the purposes of the present invention it is preferable for at least the polymerization stages ii. and iii. to be carried out under starved feed conditions. This has the advantage that the formation of new particle nuclei within these two polymerization stages is effectively minimized. Instead, the particles existing after stage i. (and therefore also called seed below) can be grown further in stage ii. by the polymerization of the monomer mixture B (therefore also called core below). It is likewise possible for the particles existing after stage ii. (also below called polymer comprising seed and core) to be grown further in stage iii. through the polymerization of the monomer mixture C (therefore also called shell below), resulting ultimately in a polymer (b) comprising particles containing seed, core, and shell (also referred to as SCS polymer). Stage i. as well may of course be carried out under starved feed conditions.

The mixtures (A), (B), and (C) are mixtures of olefinically unsaturated monomers. Suitable olefinically unsaturated monomers may be mono- or polyolefinically unsaturated. Described first of all below are monomers which can be used in principle and which are suitable across all mixtures (A), (B), and (C), and monomers that are optionally preferred. Specific preferred embodiments of the individual mixtures are addressed thereafter.

Examples of suitable monoolefinically unsaturated monomers include, in particular, (meth)acrylate-based monoolefinically unsaturated monomers, monoolefinically unsaturated monomers containing allyl groups, and other monoolefinically unsaturated monomers containing vinyl groups, such as vinylaromatic monomers, for example. The term (meth)acrylic or (meth)acrylate for the purposes of the present invention encompasses both methacrylates and acrylates. Preferred for use at any rate, although not necessarily exclusively, are (meth)acrylate-based monoolefinically unsaturated monomers.

The (meth)acrylate-based monoolefinically unsaturated monomers may be, for example, (meth)acrylic acid and esters, nitriles, or amides of (meth)acrylic acid. Preference is given to esters of (meth)acrylic acid having a non-olefinically unsaturated radical R.

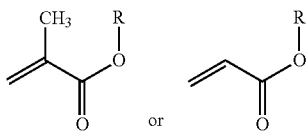

The radical R may be saturated aliphatic, aromatic, or mixed saturated aliphatic-aromatic. Aliphatic radicals for the purposes of the present invention are all organic radicals which are not aromatic. Preferably the radical R is aliphatic. The saturated aliphatic radical may be a pure hydrocarbon radical or it may include heteroatoms from bridging groups (for example, oxygen from ether groups or ester groups) and/or may be substituted by functional groups containing heteroatoms (alcohol groups, for example). For the purposes of the present invention, therefore, a clear distinction is made between bridging groups containing heteroatoms and functional groups containing heteroatoms (that is, terminal functional groups containing heteroatoms).

Preference is given at any rate, though not necessarily exclusively, to using monomers in which the saturated aliphatic radical R is a pure hydrocarbon radical (alkyl radical), in other words one which does not include any heteroatoms from bridging groups (oxygen from ether groups, for example) and is also not substituted by functional groups (alcohol groups, for example). If R is an alkyl radical, it may for example be a linear, branched, or cyclic alkyl radical. Such an alkyl radical may of course also have linear and cyclic or branched and cyclic structural components. The alkyl radical preferably has 1 to 20, more preferably 1 to 10, carbon atoms.

Particularly preferred monounsaturated esters of (meth)acrylic acid with an alkyl radical are methyl (meth)acrylate, ethyl (meth)acrylate, propyl (meth)acrylate, isopropyl (meth)acrylate, n-butyl (meth)acrylate, isobutyl (meth)acrylate, tert-butyl (meth)acrylate, amyl (meth)acrylate, hexyl (meth)acrylate, ethylhexyl (meth)acrylate, 3,3,5-trimethylhexyl (meth)acrylate, stearyl (meth)acrylate, lauryl (meth)acrylate, cycloalkyl (meth)acrylates, such as cyclopentyl (meth)acrylate, isobornyl (meth)acrylate, and also cyclohexyl (meth)acrylate, with very particular preference being given to n- and tert-butyl (meth)acrylate and to methyl methacrylate.

Examples of other suitable radicals R are saturated aliphatic radicals which comprise functional groups containing heteroatoms (for example, alcohol groups or phosphoric ester groups). Suitable monounsaturated esters of (meth)acrylic acid with a saturated aliphatic radical substituted by one or more hydroxyl groups are 2-hydroxyethyl (meth)acrylate, 2-hydroxypropyl (meth)acrylate, 3-hydroxypropyl (meth)acrylate, 3-hydroxybutyl (meth)acrylate, and 4-hydroxybutyl (meth)acrylate, with very particular preference being given to 2-hydroxyethyl (meth)acrylate. Suitable monounsaturated esters of (meth)acrylic acid with phosphoric ester groups are, for example, phosphoric esters of polypropylene glycol monomethacrylate, such as the commercially available Sipomer PAM 200 from Rhodia. Possible further monoolefinically unsaturated monomers containing vinyl groups are monomers which are different from the above-described acrylate-based monomers and which have a radical R' on the vinyl group that is not olefinically unsaturated:

The radical R' may be saturated aliphatic, aromatic, or mixed saturated aliphatic-aromatic, with preference being given to aromatic and mixed saturated aliphatic-aromatic radicals in which the aliphatic components represent alkyl groups.

Particularly preferred further monoolefinically unsaturated monomers containing vinyl groups are, in particular, vinyltoluene, alpha-methylstyrene, and especially styrene.

Also possible are monounsaturated monomers containing vinyl groups, wherein the radical R' has the following structure:

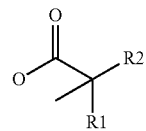

where the radicals R1 and R2 are alkyl radicals which each or together contain a total of 7 carbon atoms. Monomers of this kind are available commercially under the name VeoVa® 10 from Momentive.

Further monomers suitable in principle are olefinically unsaturated monomers such as acrylonitrile, methacrylonitrile, acrylamide, methacrylamide, N-dimethylacrylamide, vinyl acetate, vinyl propionate, vinyl chloride, N-vinylpyrrolidone, N-vinylcaprolactam, N-vinylformamide, N-vinyl imidazole, N-vinyl-2-methylimidazoline, and further unsaturated alpha-beta-carboxylic acids.

Examples of suitable polyolefinically unsaturated monomers include esters of (meth)acrylic acid with an olefinically unsaturated radical R". The radical R" may be, for example, an allyl radical or a (meth)acryloyl radical:

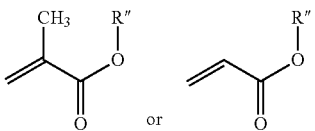

Preferred polyolefinically unsaturated monomers include ethylene glycol di(meth)acrylate, 1,2-propylene glycol di(meth)acrylate, 2,2-propylene glycol di(meth)acrylate, butane-1,4-diol di(meth)acrylate, neopentyl glycol di(meth)acrylate, 3-methylpentanediol di(meth)acrylate, diethylene glycol di(meth)acrylate, triethylene glycol di(meth)acrylate, tetraethylene glycol di(meth)acrylate, dipropylene glycol di(meth)acrylate, tripropylene glycol di(meth)acrylate, hexanediol di(meth)acrylate, and allyl (meth)acrylate.

Furthermore, preferred polyolefinically unsaturated compounds encompass acrylic and methacrylic esters of alcohols having more than two OH groups, such as, for example, trimethylolpropane tri(meth)acrylate or glycerol tri(meth)acrylate, but also trimethylolpropane di(meth)acrylate monoallyl ether, trimethylolpropane (meth)acrylate diallyl ether, pentaerythritol tri(meth)acrylate monoallyl ether, pentaerythritol di(meth)acrylate diallyl ether, pentaerythritol (meth)acrylate triallyl ether, triallylsucrose, and pentaallylsucrose. Also possible are allyl ethers of mono- or polyhydric alcohols, such as trimethylolpropane monoallyl ether, for example. Where used, preferred polyolefinically unsaturated monomers are hexanediol diacrylate and/or allyl (meth)acrylate.

With regard to the monomer mixtures (A), (B), and (C) used in the individual polymerization stages, there are preferably specific conditions to be observed, which are set out below. First of all it should be stated that the mixtures (A), (B), and (C) are at any rate different from one another. They therefore each contain different monomers and/or different proportions of at least one defined monomer.

Mixture (A)

Mixture (A) comprises at least 50 wt %, preferably at least 55 wt %, of olefinically unsaturated monomers having a water solubility of less than 0.5 g/l at 25° C. One such preferred monomer is styrene. The solubility of the monomers in water is determined by the method described hereinafter.

The monomer mixture (A) preferably contains no hydroxy-functional monomers. Likewise preferably, the monomer mixture (A) contains no acid-functional monomers. Very preferably the monomer mixture (A) contains no monomers at all that have functional groups containing heteroatoms. This means that heteroatoms, if present, are present only in the form of bridging groups. This is the case, for example, in the monoolefinically unsaturated monomers described above that are (meth)acrylate-based and possess an alkyl radical as radical R.

The monomer mixture (A) preferably comprises exclusively monoolefinically unsaturated monomers.

The monomer mixture (A) preferably comprises at least one monounsaturated ester of (meth)acrylic acid with an alkyl radical and at least one monoolefinically unsaturated monomer containing vinyl groups, with a radical arranged on the vinyl group that is aromatic or that is mixed saturated aliphatic-aromatic, in which case the aliphatic fractions of the radical are alkyl groups.

The monomers present in the mixture (A) are selected such that a polymer prepared from them possesses a glass transition temperature of 10 to 65° C., preferably of 30 to 50° C. The glass transition temperature here can be determined by the method described hereinafter.

The polymer prepared in stage i. by the emulsion polymerization of the monomer mixture (A) is also called seed. The seed possesses preferably an average particle size of 20 to 125 nm (measured by dynamic light scattering as described hereinafter; cf. Determination method 4.).

Mixture (B)

Mixture (B) comprises at least one polyolefinically unsaturated monomer, more preferably at least one diolefinically unsaturated monomer. One such preferred monomer is hexanediol diacrylate. The monomer mixture (B) preferably contains no hydroxy-functional monomers. Likewise preferably, the monomer mixture (B) contains no acid-functional monomers. Very preferably the monomer mixture (B) contains no monomers at all with functional groups containing heteroatoms. This means that heteroatoms, if present, are present only in the form of bridging groups. This is the case, for example, in the above-described monoolefinically unsaturated monomers which are (meth)acrylate-based and possess an alkyl radical as radical R.

Preferably, the monomer mixture (B), as well as the at least one polyolefinically unsaturated monomer, includes at any rate the following further monomers: First of all, at least one monounsaturated ester of (meth)acrylic acid with an alkyl radical, and secondly at least one monoolefinically unsaturated monomer containing vinyl groups and having a radical located on the vinyl group that is aromatic or that is a mixed saturated aliphatic-aromatic radical, in which case the aliphatic fractions of the radical are alkyl groups.

The fraction of polyunsaturated monomers is preferably from 0.05 to 3 mol %, based on the total molar amount of monomers in the monomer mixture (B).

The monomers present in the mixture (B) are selected such that a polymer prepared therefrom possesses a glass transition temperature of −35 to 15° C., preferably of −25 to +7° C. The glass transition temperature here can be determined by the method described hereinafter.

The polymer prepared in the presence of the seed in stage ii. by the emulsion polymerization of the monomer mixture (B) is also referred to as the core. After stage ii., then, the result is a polymer which comprises seed and core. The polymer which is obtained after stage ii. preferably possesses an average particle size of 80 to 280 nm, preferably 120 to 250 nm (measured by dynamic light scattering as described hereinafter; cf. Determination method 4.).

Mixture (C)

The monomers present in the mixture (C) are selected such that a polymer prepared therefrom possesses a glass transition temperature of −50 to 15° C., preferably of −20 to +12° C. The glass transition temperature here can be determined by the method described hereinafter.

The olefinically unsaturated monomers of this mixture (C) are preferably selected such that the resulting polymer, comprising seed, core, and shell, has an acid number of 10 to 25. Accordingly, the mixture (C) preferably comprises at least one alpha-beta unsaturated carboxylic acid, especially preferably (meth)acrylic acid. The olefinically unsaturated monomers of the mixture (C) are further or alternatively preferably selected such that the resulting polymer, comprising seed, core, and shell, has an OH number of 0 to 30, preferably 10 to 25. All of the aforementioned acid numbers and OH numbers are values calculated on the basis of the monomer mixtures employed overall.

The monomer mixture (C) preferably comprises at least one alpha-beta unsaturated carboxylic acid and at least one monounsaturated ester of (meth)acrylic acid having an alkyl radical substituted by a hydroxyl group. More preferably, the monomer mixture (C) comprises at least one alpha-beta unsaturated carboxylic acid, at least one monounsaturated ester of (meth)acrylic acid having an alkyl radical substituted by a hydroxyl group, and at least one monounsaturated ester of (meth)acrylic acid having an alkyl radical. Where reference is made, in the context of the present invention, to an alkyl radical, without further particularization, what is always meant by this is a pure alkyl radical without functional groups and heteroatoms.

The polymer prepared in the presence of seed and core in stage iii. by the emulsion polymerization of the monomer mixture (C) is also referred to as the shell. The result after stage iii., then, is a polymer which comprises seed, core, and shell, i.e., polymer (b). Following its preparation, the polymer (b) possesses an average particle size of 100 to 500 nm, preferably 125 to 400 nm, very preferably from 130 to 300 nm (measured by dynamic light scattering as described hereinafter; cf. Determination method 4.).

The fractions of the monomer mixtures are preferably harmonized with one another as follows: The fraction of the mixture (A) is from 0.1 to 10 wt %, the fraction of the mixture (B) is from 60 to 80 wt %, and the fraction of the mixture (C) is from 10 to 30 wt %, based in each case on the sum of the individual amounts of the mixtures (A), (B), and (C).

As already noted above, the polymer (b) is used preferably in the form of an aqueous dispersion for producing the pigment paste of the invention. This aqueous dispersion preferably possesses a pH of 5.0 to 9.0, more preferably 7.0 to 8.5, very preferably 7.5 to 8.5. The pH may be kept constant during the preparation itself, through the use of bases as identified further on below, for example, or else may be set deliberately after the polymer has been prepared. In especially preferred embodiments it is the case that this aqueous dispersion has a pH of 5.0 to 9.0 and the at least one polymer (b) present therein has a particle size of 100 to 500 nm. Even more preferred range combinations are as follows: pH of 7.0 to 8.5 and a particle size of 125 to 400 nm, more preferably pH of 7.5 to 8.5 and a particle size of 130 to 300 nm.

The stages i. to iii. described are carried out preferably without addition of acids or bases known for the setting of the pH. If in the preparation of the polymer (b), for example, carboxy-functional monomers are then used, as is preferred in the context of stage iii., the pH of the dispersion may be less than 7 after the end of stage iii. Accordingly, an addition of base may be needed in order to adjust the pH to a higher value, such as, for example, a value within the preferred ranges. It follows from the above that the pH in this case preferably after stage iii. is correspondingly adjusted or has to be adjusted, in particular through addition of a base such as an organic, nitrogen-containing base, such as an amine such as ammonia, trimethylamine, triethylamine, tributylamines, dimethylaniline, triphenylamine, N,N-dimethylethanolamine, methyldiethanolamine, or triethanolamine, and also by addition of sodium hydrogencarbonate or borates, and also mixtures of the aforesaid substances. This, however, does not rule out the possibility of adjusting the pH before, during, or after the emulsion polymerizations or else between the individual emulsion polymerizations. It is likewise possible for there to be no need at all for the pH to be adjusted to a desired value, owing to the choice of the monomers. The measurement of the pH here is carried out preferably using a pH meter (for example, Mettler-Toledo S20 SevenEasy pH meter) having a combined pH electrode (for example, Mettler-Toledo InLab® Routine).

If the polymer (b) is used in the form of an aqueous dispersion for producing the pigment paste of the invention, the nonvolatile fraction is preferably in the range from 15 to 40 wt %, more preferably in the range from 20 to 30 wt %, based in each case on the total weight of the aqueous dispersion. The nonvolatile fraction here is determined by the method described hereinafter. The aqueous dispersion used preferably comprises a water fraction of 55 to 75 wt %, especially preferably of 60 to 70 wt %, based in each case on the total weight of the dispersion. The percentage sum of the solids content of the dispersion and the water fraction in the dispersion is preferably at least 80 wt %, preferably at least 90 wt %. Preferred in turn are ranges from 80 to 99 wt %, more particularly 90 to 97.5 wt %. Accordingly, the aqueous dispersion used consists very largely of water and the polymer (b), and comprises only minor fractions, or none, of environmentally burdensome components such as, in particular, organic solvents.

Further Optional Components of the Pigment Paste of the Invention

The pigment paste of the invention may comprise further, optional constituents and optional components:

Besides the at least one color pigment (a), the pigment paste may further comprise at least one effect pigment, which is different from the color pigment (a).

A skilled person is familiar with the concept of effect pigments. A corresponding definition is found for example in Römpp Lexikon, Lacke and Druckfarben, Georg Thieme Verlag, 1998, 10th edition, pages 176 and 471. Effect pigments are preferably pigments which impart optical effect or both color and optical effect, especially optical effect. The terms "optical effect and color pigment", "optical effect pigment" and "effect pigment" are therefore preferably interchangeable.

Preferred effect pigments are, for example, platelet-shaped metal effect pigments such as lamellar aluminum pigments, gold bronzes, oxidized bronzes and/or iron oxide-aluminum pigments, pearlescent pigments such as pearl essence, basic lead carbonate, bismuth oxychloride and/or metal oxide-on-mica pigments, and/or other effect pigments such as lamellar graphite, lamellar iron oxide, multilayer effect pigments composed of PVD films, and/or liquid-crystal polymer pigments. Particularly preferred are lamellar effect pigments, especially lamellar aluminum pigments and metal oxide-on-mica pigments, in the pigment paste.

The fraction of the effect pigments is situated preferably in the range from 1.0 to 50.0 wt %, preferably 2.0 to 45.0 wt %, more preferably 5.0 to 40.0 wt %, based in each case on the total weight of the aqueous pigment paste. Preferably, however, the pigment paste of the invention comprises the at least one color pigment (a) as sole pigment, meaning that it preferably contains no additional pigments such as effect pigments. Preferably, furthermore, the pigment paste of the invention contains no fillers.

The pigment paste may optionally further comprise at least one thickener (also called thickening agent). Examples of such thickeners are inorganic thickeners, examples being metal silicates such as phyllosilicates, and organic thickeners, examples being poly(meth)acrylic acid thickeners and/or (meth)acrylic acid-(meth)acrylate copolymer thickeners, polyurethane thickeners, and polymeric waxes. The metal silicate is preferably selected from the group of the smectites. With particular preference the smectites are selected from the group of the montmorillonites and hectorites. More particularly the montmorillonites and hectorites are selected from the group consisting of aluminum magnesium silicates and also sodium magnesium phyllosilicates and sodium magnesium fluorine lithium phyllosilicates. These inorganic phyllosilicates are sold for example under the brand name Laponite®. Thickening agents based on poly(meth)acrylic acid, and (meth)acrylic acid-(meth)acrylate copolymer thickeners are optionally crosslinked and/or neutralized with a suitable base. Examples of such thickening agents are Alkali Swellable Emulsions (ASE), and hydrophobically modified variants thereof, the "Hydrophilically modified Alkali Swellable Emulsions" (HASE). These thickening agents are preferably anionic. Corresponding products such as Rheovis® AS 1130 are available commercially. Thickening agents based on polyurethanes (e.g., polyurethane associative thickening agents) are optionally crosslinked and/or neutralized with a suitable base. Corresponding products such as Rheovis® PU 1250 are available commercially. Examples of suitable polymeric waxes include optionally modified polymeric waxes based on ethylene-vinyl acetate copolymers. Corresponding products are available commercially, for example, under the Aquatix® designation. The at least one thickener is preferably present in the pigment paste of the invention in an amount of at most 10 wt %, more preferably of at most 7.5 wt %, very preferably of at most 5 wt %, more particularly of at most 3 wt %, most preferably of at most 2 wt %, based in each case on the total weight of the pigment paste.

Depending on desired application, the pigment paste of the invention may comprise one or more customarily employed additives as (a) further component(s). For example, as already noted above, the pigment paste may include a certain fraction of at least one organic solvent. Further, the pigment paste may comprise at least one additive selected from the group consisting of reactive diluents, fillers, light stabilizers, antioxidants, deaerating agents, emulsifiers, slip additives, polymerization inhibitors, initiators of radical polymerizations, adhesion promoters, flow control agents, film-forming auxiliaries, sag control agents (SCAs), flame retardants, corrosion inhibitors, siccatives, biocides, and matting agents. They may be used in the known and customary fractions. The amount thereof, based on the total weight of the pigment paste of the invention, is preferably 0.01 to 20.0 wt %, more preferably 0.05 to 15.0 wt %, very preferably 0.1 to 10.0 wt %, especially preferably 0.1 to 7.5 wt %, more particularly 0.1 to 5.0 wt %, and most preferably 0.1 to 2.5 wt %.

The pigment paste of the invention can be produced using the mixing assemblies and mixing methods that are customary and known for the production of pigment pastes.

Basecoat Material of the Invention

The pigment paste of the invention is suitable for producing an aqueous basecoat material. A further subject of the present invention is therefore an aqueous basecoat material, wherein the basecoat material is preparable by admixing at least one pigment paste of the invention as component (1) to at least one aqueous component (2) which is suitable for preparing a basecoat material and which comprises at least one polymer which can be used as binder, this polymer which can be used as binder comprising the polymer (b) also present in the pigment paste, and/or comprising at least one polymer different therefrom.

The fractions in wt % of all the components (1), (2) and water that are present in the basecoat material of the invention, and also of any further components additionally present, add up to 100 wt %, based on the total weight of the basecoat material.

All preferred embodiments described hereinabove in connection with the pigment paste of the invention are also preferred embodiments with regard to the use of this pigment paste for producing the basecoat material of the invention, especially in connection with components (a) and (b) of the pigment paste.

The concept of the basecoat material is known to a skilled person and defined for example in Römpp Lexikon, Lacke and Druckfarben, Georg Thieme Verlag, 1998, 10th edition, page 57. A basecoat, accordingly, is more particularly a color-imparting, and/or color-imparting and optical-effect-imparting, intermediate coating material that is used in automotive finishing and general industrial coating. It is applied generally to a metallic or plastics substrate which has been pretreated with surfacer or primer-surfacer, and occasionally is also applied directly to the plastics substrate. Old finishes as well, which may have to be further pretreated (by sanding down, for example) may serve as substrates. It is now entirely customary for more than one basecoat film to be applied. In one such case, accordingly, a first basecoat film represents the substrate for a second. In order to protect a basecoat film against environmental effects in particular, at least one additional clearcoat film is applied to it.

The component (2) used for producing the basecoat material of the invention comprises at least one polymer which can be employed as binder, and this polymer which can be employed as binder comprises the polymer (b) present in the pigment paste, and/or at least one polymer different therefrom. Preferably the polymer which can be employed as binder and which is present in component (2) comprises the polymer (b) which is also present in the pigment paste.

As a result of the use of the pigment paste of the invention in its production, the basecoat material comprises at least one polymer (b). The at least one polymer (b) is preferably the principal binder of the basecoat material. Principal binder is a term used for a binder constituent in the context of the present invention preferably when there is no other binder constituent in the coating composition, such as the basecoat material, that is present in a greater fraction, based on the total weight of the respective coating composition. The concept of binder has already been defined above with reference to DIN EN ISO 4618 (German version, date: March 2007).

The basecoat material of the invention is aqueous. It preferably comprises a system whose principal solvent is water, preferably in an amount of at least 20 wt %, and comprises organic solvents in lower fractions, preferably in an amount of <20 wt %, based in each case on the total weight of the basecoat material of the invention.

The basecoat material of the invention preferably comprises a water fraction of at least 20 wt %, more preferably of at least 25 wt %, very preferably of at least 30 wt %, more particularly of at least 35 wt %, based in each case on the total weight of the basecoat material.

The basecoat material of the invention preferably comprises a water fraction which is in a range from 20 to 60 wt %, more preferably in a range from 25 to 55 wt %, very preferably in a range from 30 to 50 wt %, based in each case on the total weight of the basecoat material.

The basecoat material of the invention preferably comprises an organic solvent fraction which is in a range of <20 wt %, more preferably in a range from 0 to <20 wt %, very preferably in a range from 0.5 to <20 wt % or to 15 wt %, based in each case on the total weight of the basecoat material.

The solids content of the basecoat material of the invention is preferably in a range from 10 to 50 wt %, more preferably from 11 to 45 wt %, very preferably from 12 to 40 wt %, more particularly from 13 to 37.5 wt %, based in each case on the total weight of the basecoat material. The solids content, i.e., the nonvolatile fraction, is determined in accordance with the method described hereinafter.

The percentage sum of the solids contents of the basecoat material of the invention and the water fraction in the basecoat material of the invention is preferably at least 40 wt %, more preferably at least 50 wt %. Preferred in turn are ranges from 40 to 95 wt %, more particularly 45 or 50 to 90 wt %. If, for example, a basecoat material of the invention has a solids content of 18 wt % and a water content of 25 wt %, the above-defined percentage sum of the solids content and the water fraction is 43 wt %.

The basecoat of the invention preferably comprises a polymer (b) fraction in a range from 1.0 to 20 wt %, more preferably from 1.5 to 19 wt %, very preferably from 2.0 to 18.0 wt %, more particularly from 2.5 to 17.5 wt %, most preferably from 3.0 to 15.0 wt %, based in each case on the total weight of the basecoat material. The fraction of the polymer (b) in the basecoat material may be determined or specified via the determination of the solids content (also called nonvolatile fraction or solids fraction) of an aqueous dispersion comprising the polymer (b) and used for producing not only the pigment paste (component 1) but also, optionally, for preparing the component (2).

The basecoat of the invention preferably comprises a color pigment (a) fraction in a range from 1 to 25 wt %, more preferably from 1.5 to 22.5 wt %, very preferably from 2 to 20 wt %, more particularly from 2.5 to 18 wt %, most preferably from 3 to 16 wt % or from 3 to 15 wt %, based in each case on the total weight of the basecoat material.

The relative weight ratio of the at least one color pigment (a) to the polymer (b) in the basecoat material is preferably in a range from 8:1 to 1:2, more preferably in a range from 6:1 to 1:1, very particularly in a range from 5:1 to 1:1, more particularly in a range from 4:1 to 1:1.

The aqueous basecoat material of the invention produced using the pigment paste of the invention preferably comprises an aqueous dispersion of the polymer (b) which is incorporated into the basecoat material at least by admixing the pigment paste. The polymer (b) has already been described above. The aqueous basecoat material of the invention at least comprises, at least through the use of the pigment paste of the invention in its production, at least one color pigment, namely color pigment (a). Corresponding color pigments (a) have already been described above. Additionally, the aqueous basecoat material of the invention may comprise further pigments different from the color pigment (a), more particularly effect pigments. Corresponding pigments have likewise already been described above. These pigments are preferably present in the component (2) which is used for producing the basecoat material. The total fraction of all pigments in the basecoat material is preferably in the range from 0.5 to 40.0 wt %, more preferably from 2.0 to 20.0 wt %, very preferably from 3.0 to 15.0 wt %, based in each case on the total weight of the basecoat material.

The aqueous basecoat material of the invention preferably further comprises at least one polymer different from the polymer (b), as binder, more particularly at least one polymer selected from the group consisting of polyurethanes, polyureas, polyesters, poly(meth)acrylates and/or copolymers of the stated polymers, more particularly polyurethane-poly(meth)acrylates and/or polyurethane-polyureas. This polymer different from the polymer (b) is present preferably in the component (2) used for producing the basecoat material. It is possible here for component (2) to contain no polymer (b), but instead to include at least one polymer selected from the group consisting of polyurethanes, polyureas, polyesters, poly(meth)acrylates and/or copolymers of the stated polymers, more particularly polyurethane-poly(meth)acrylates and/or polyurethane-polyureas.

Preferred polyurethanes are described for example in German patent application DE 199 48 004 A1, page 4, line 19 to page 11, line 29 (Polyurethane prepolymer B1), in European patent application EP 0 228 003 A1, page 3, line 24 to page 5, line 40, in European patent application EP 0 634 431 A1, page 3, line 38 to page 8, line 9, and in international patent application WO 92/15405, page 2, line 35 to page 10, line 32.

Preferred polyesters are described for example in DE 4009858 A1 in column 6, line 53 to column 7, line 61 and column 10, line 24 to column 13, line 3, or WO 2014/033135 A2, page 2, line 24 to page 7, line 10 and also page 28, line 13 to page 29, line 13.

Preferred polyurethane poly(meth)acrylate copolymers ((meth)acrylated polyurethanes) and their preparation are described for example in WO 91/15528 A1, page 3, line 21 to page 20, line 33, and also in DE 4437535 A1, page 2, line 27 to page 6, line 22.

Preferred polyurethane-polyurea copolymers are polyurethane-polyurea particles, preferably those having an average particle size of 40 to 2000 nm, with the polyurethane-polyurea particles, in each case in reacted form, comprising at least one isocyanate-group-containing polyurethane prepolymer containing anionic groups and/or groups which can be converted into anionic groups, and also at least one polyamine containing two primary amino groups and one or two secondary amino groups. Such copolymers are used preferably in the form of an aqueous dispersion. Polymers of this kind are preparable in principle by conventional polyaddition of, for example, polyisocyanates with polyols and also polyamines. The average particle size of such polyurethane-polyurea particles is determined as described hereinafter (measured by dynamic light scattering as described hereinafter; cf. Determination method 4.).

The fraction of such polymers different from the polymer (b) in the basecoat material is preferably less than the fraction of the polymer (b) in the basecoat material. The polymers described are preferably hydroxy-functional and especially preferably possess an OH number in the range from 15 to 200 mg KOH/g, more preferably from 20 to 150 mg KOH/g.

With particular preference the basecoat materials comprise at least one hydroxy-functional polyurethane-poly(meth)acrylate copolymer, more preferably at least one hydroxy-functional polyurethane-poly(meth)acrylate copolymer and also at least one hydroxy-functional polyester and also, optionally, a preferably hydroxy-functional polyurethane-polyurea copolymer.

The fraction of the further polymers as binders may vary widely and is situated preferably in the range from 1.0 to 25.0 wt %, more preferably 3.0 to 20.0 wt %, very preferably 5.0 to 15.0 wt %, based in each case on the total weight of the basecoat material.

The basecoat material of the invention may further comprise at least one typical crosslinking agent known per se. If it does include a crosslinking agent, that agent is preferably at least one amino resin and/or at least one blocked or free polyisocyanate, preferably an amino resin. Among the amino resins, melamine resins are especially preferred. If the basecoat material does contain crosslinking agent, the fraction of these crosslinking agents, especially amino resins and/or blocked or free polyisocyanates, very preferably amino resins, and preferably in turn melamine resins, is situated preferably in the range from 0.5 to 20.0 wt %, more preferably 1.0 to 15.0 wt %, very preferably 1.5 to 10.0 wt %, based in each case on the total weight of the basecoat material. The fraction of crosslinking agent is preferably smaller than the fraction of the polymer (b) in the basecoat material.

Further Optional Components of the Basecoat Material of the Invention

The basecoat material of the invention may comprise further optional constituents or optional components. These are the same further constituents identified above in connection with the pigment paste of the invention, such as effect pigments, thickeners, organic solvents, and the further additives specified above.

The fraction of the effect pigments is preferably in the range from 0.5 to 30.0 wt %, more preferably 1.0 to 25.0 wt %, very preferably 1.5 to 15.0 wt %, based in each case on the total weight of the aqueous basecoat material. The at least one thickener is present in the basecoat material of the invention preferably in an amount of at most 10 wt %, more preferably of at most 7.5 wt %, very preferably of at most 5 wt %, more particularly of at most 3 wt %, most preferably of at most 2 wt %, based in each case on the total weight of the basecoat material. The amount of the at least one further additive, based on the total weight of the basecoat material of the invention, is preferably 0.01 to 20.0 wt %, more preferably 0.05 to 15.0 wt %, very preferably 0.1 to 10.0 wt %, especially preferably 0.1 to 7.5 wt %, more particularly 0.1 to 5.0 wt %, and most preferably 0.1 to 2.5 wt %.

The basecoat material of the invention may be produced using the mixing assemblies and mixing methods customary and known for the production of basecoat materials, but using the pigment paste of the invention as admixture component (component (1)).

Use of the Polymer (b) for Dispersing Color Pigments within an Aqueous Color Pigment Paste The polymer (b) is suitable for dispersing color pigments within an aqueous color pigment paste. A further subject of the present invention is therefore a use of the polymer (b) identified in connection with the first subject of the present invention for dispersing color pigments within an aqueous color pigment paste.

All preferred embodiments described hereinabove in connection with the pigment paste of the invention and the basecoat material of the invention are also preferred embodiments in relation to the use of the polymer (b) for dispersing color pigments within an aqueous color pigment paste.

Multicoat Paint System

A further subject of the present invention is a method for producing a multicoat paint system, by
(1a) applying an aqueous basecoat material to a substrate,
(2a) forming a polymer film from the coating material applied in stage (1a),
(1b) optionally applying a further aqueous basecoat material to the polymer film thus formed,
(2b) optionally forming a polymer film from the coating material applied in stage (1b),
(3) applying a clearcoat material to the resultant basecoat film(s), and subsequently
(4) jointly curing the basecoat film(s) together with the clearcoat film, wherein the basecoat material of the invention is used in stage (1a) or—if the method further comprises stages (1b) and (2b)—in stage (1a) and/or (1b), preferably in stage (1b). All above-stated (preferred) versions of the pigment paste of the invention and of the aqueous basecoat material of the invention are also applicable to the method of the invention. The method is used for producing color-imparting and color-and-effect-imparting multicoat paint systems.

The substrate used in stage (1a) preferably has an electrocoat film (EC), more preferably an electrocoat film applied by cathodic deposition of an electrocoat material, and the basecoat material used in stage (1a) is applied directly to the EC-coated, preferably metallic substrate, the electrocoat film (EC) applied to the substrate being preferably cured during implementation of stage (1a). Then, in stage (4), preferably, the basecoat film applied as per stages (1a) and (2a) to the preferably metallic substrate coated with a preferably cathodic cured electrocoat film is cured jointly with the further basecoat film, applied to the first basecoat film as per stages (1b) and (2b), and with the clearcoat film, applied in turn to the further basecoat film as per stage (3).

Application of the aqueous basecoat material of the invention takes place customarily to metallic or plastics substrates which have been pretreated with surfacer or primer-surfacer. Said basecoat material may optionally also be applied directly to the plastics substrate. Alternatively, the aqueous basecoat material of the invention may preferably be applied even without prior coating of the substrate, particularly a metallic substrate, with a surfacer or primer-surfacer: in this case, the method of the invention preferably includes stages (1b) and (2b), meaning that at least two basecoat films are applied, with the basecoat material of the invention being employed within stages (1a) and/or (1b), more preferably only within stage (1b). In this case the metallic substrate used is preferably coated with a cured electrocoat film.

If a metal substrate is to be coated, it is preferably coated with an electrocoat system as well, prior to the application of the surfacer or primer-surfacer or of the aqueous basecoat material of the invention. If a plastics substrate is being coated, it is preferably also pretreated prior to the application of the surfacer or primer-surfacer or of the aqueous basecoat material of the invention. The methods most frequently employed for such pretreatment are flaming, plasma treatment, and corona discharge. Flaming is used with preference. Application of the aqueous basecoat material or materials of the invention to a metallic substrate may take place in the film thicknesses that are customary in the context of the automobile industry, in the range from, for example, 5 to 100 micrometers, preferably 5 to 60 micrometers, especially preferably 5 to 30 micrometers. This is done employing spray application methods, such as, for example, compressed air spraying, airless spraying, high-speed rotation, electrostatic spray application (ESTA), alone or in conjunction with hot spray applications such as hot air spraying, for example.

Following application of the aqueous basecoat material or materials, it or they may be dried by known methods. For example, (one-component) basecoat materials, which are preferred, are flashed off at room temperature (23° C.) for 1 to 60 minutes and subsequently dried preferably at optionally slightly elevated temperatures of 30 to 90° C. Flashing off and drying in the context of the present invention means the evaporation of organic solvents and/or water, as a result of which the coating material becomes drier, but is not yet cured, or as yet no fully crosslinked coating film is formed.

Then a commercially customary clearcoat material is applied, again by usual methods, the film thicknesses again being within the usual ranges, of 5 to 100 micrometers, for example.

Following the application of the clearcoat material, it can be flashed off at room temperature (23° C.) for 1 to 60 minutes, for example, and optionally dried. The clearcoat is then cured together with the applied basecoat. At this stage, for example, crosslinking reactions take place, so producing a multicoat, effect-imparting and/or color-and-effect-imparting paint system on a substrate. Curing is preferably accomplished thermally at temperatures of 60 to 200° C. The coating of plastics substrates takes place basically in a similar way to that of metallic substrates. Here, however, curing takes place generally at much lower temperatures of 30 to 90° C. Preference is therefore given to using two-component clearcoat materials.

The method of the invention can be used to coat metallic and nonmetallic substrates, more particularly plastics substrates, preferably automobile bodies or parts thereof. The method of the invention may also be used for dual finishing as part of OEM finishing. This means that a substrate which has been coated by means of the method of the invention is painted a second time, likewise by means of the method of the invention.

Said substrate from stage (1a) may also be a multicoat paint system possessing defects. In the case of this multicoat paint system substrate possessing defects, then, the substrate is an original finish which is to be made good or completely repainted. The method of the invention is suitable, accordingly, for the repair of defects on multicoat paint systems. Defects or film defects are terms used generally for defects on and in the coating, usually named according to their shape or their appearance. The skilled person is aware of a large number of possible kinds of such film defects. They are described for example in Römpp Lexikon, Lacke and Druckfarben, Georg Thieme Verlag, Stuttgart, N.Y., 1998, page 235, "Film defects".

Determination Methods

1. Determination of the Nonvolatile Fraction

The nonvolatile fraction (the solids content) is determined according to DIN EN ISO 3251 (date: June 2008). 1 g of sample is weighed out into an aluminum dish which has been dried beforehand and the dish with sample is dried in a drying cabinet at 125° C. for 60 minutes, cooled in a desiccator, and then reweighed. The residue relative to the total amount of sample used corresponds to the nonvolatile fraction.

2. Determination of the Solubility of the Monomers of the Mixture (A) in Water that are Used in Preparing the Polymer (b)

The solubility of the monomers in water is determined via establishment of equilibrium with the gas space above the aqueous phase (in analogy to the reference X.-S. Chai, Q. X. Hou, F. J. Schork, Journal of Applied Polymer Science Vol. 99, 1296-1301 (2006)). For this purpose, in a 20 ml gas space sample tube, a defined volume of water, such as 2 ml, is admixed with the respective monomer in a mass so great that it is unable to dissolve, or at any rate to dissolve completely, in the volume of water selected. Additionally an emulsifier (10 ppm, based on total mass of the sample mixture) is added. To obtain the equilibrium concentration, the mixture is shaken continually. The supernatant gas phase is replaced by inert gas, thus re-establishing an equilibrium. In the gas phase removed, the fraction of the substance to be detected is measured in each case (by gas chromatography, for example). The equilibrium concentration in water can be determined by plotting the fraction of the monomer in the gas phase as a graph. The slope of the curve changes from a virtually constant value (S1) to a significantly negative slope (S2) as soon as the excess monomer fraction has been removed from the mixture. The equilibrium concentration here is reached at the point of intersection of the straight line with the slope S1 and of the straight line with the slope S2. The determination described is carried out at 25° C.

3. Determination of the Glass Transition Temperatures of Polymers Obtainable in Each Case from Monomers of the Mixtures (A), (B), and (C), Respectively The glass transition temperature $T_g$ is determined experimentally in a method based on DIN 51005 (date: August 2005) "Thermal Analysis (TA)—terms" and DIN 53765 (date: March 1994) "Thermal Analysis—Dynamic Scanning calorimetry (DSC)". This involves weighing out a 15 mg sample into a sample boat and introducing the boat into a DSC instrument. Cooling takes place to the starting temperature, after which 1st and 2nd measurement runs are carried out under inert gas purging ($N_2$) of 50 ml/min at a heating rate of 10 K/min, with cooling back to the starting temperature between the measurement runs. Measurement takes place in the temperature range from approximately 50° C. lower than the expected glass transition temperature to approximately 50° C. higher than the expected glass transition temperature. The glass transition temperature recorded, in accordance with DIN 53765, section 8.1, is the temperature in the 2nd measurement run at which half of the change in specific heat capacity (0.5 delta cp) has been reached. It is determined from the DSC diagram (plot of heat flow against temperature). It is the temperature corresponding to the point of intersection of the midline between the extrapolated baselines before and after the glass transition with the measurement plot. For a useful estimation of the glass transition temperature to be expected in the measurement, the known Fox equation can be employed. Since the Fox equation represents a good approximation, based on the glass transition temperatures of the homopolymers and their weight fractions, without including the molecular weight, it may be used as a useful tool for the skilled person at the synthesis stage, allowing a desired glass transition temperature to be set via a few goal-directed trials.

4. Determination of the Average Particle Size of the Polymer (b) and of the Optionally Employable Polyurethane-Polyurea Particles The average particle size is determined by dynamic light scattering (photon correlation spectroscopy) (PCS) in a method based on DIN ISO 13321 (date: October 2004). The term "average particle size" is understood here to mean the measured average particle size (Z-average mean). Measurement takes place using a Malvern Nano S90 (from Malvern Instruments) at 25±1° C. The instrument covers a size range from 3 to 3000 nm and is equipped with a 4 mW He—Ne laser at 633 nm. Each of the samples are diluted with particle-free deionized water as dispersing medium and then measured in a 1 ml polystyrene cuvette at suitable scattering intensity. Evaluation was made using a digital correlator with assistance from the Zetasizer software, version 7.11 (from Malvern Instruments). Measurement is carried out five times and the measurements are repeated on a second, freshly prepared sample. For the polymer (b), the average particle size refers to the arithmetic numerical average of the measured mean particle diameter (Z-average mean; numerical average). The standard deviation of a 5-fold determination in this case is 4%. For the optionally employable polyurethane-polyurea particles, the average particle size refers to the arithmetic volume average of the average particle size of the individual preparations (V-average mean; volume average). The maximum deviation of the volume average from five individual measurements is ±15%. Verification takes place with polystyrene standards having certified particle sizes between 50 to 3000 nm.

5. Determination of Number-Average Molecular Weight

The number-average molecular weight ($M_n$) is determined, unless otherwise specified, using a model 10.00 vapor pressurosmometer (from Knauer) on concentration series in toluene at 50° C. with benzophenone as a calibrating substance for determining the experimental calibration constant of the instrument used, in accordance with E. Schröder, G. Müller, K.-F. Arndt, "Leitfaden der Polymercharakterisierung" [Principles of polymer characterization], Akademie-Verlag, Berlin, pp. 47-54, 1982.

6. Determination of the Film Thicknesses

The film thicknesses are determined according to DIN EN ISO 2808 (date: May 2007), method 12A, using the MiniTest® 3100-4100 instrument from ElektroPhysik.

7. Determination of the Storage Stability

For determination of the storage stability, the samples under investigation are analyzed before and after storage at 40° C. for weeks, using a rotational viscometer complying with DIN 53019-1 (date: September 2008) and calibrated according to DIN 53019-2 (date: February 2001), under standardized conditions (23.0° C.±0.2° C.). These samples are subjected to shearing first for 5 minutes at a shear rate of 1000 $s^{-1}$ (loading phase) and then for 8 minutes at a shear rate of 1 $s^{-1}$ (unloading phase). The average viscosity level during the loading phase (high-shear viscosity) and also the level after 8 minutes of unloading phase (low-shear viscosity) are determined from the measurement data, and the values before and after storage are compared with one another by calculation of the respective percentage changes.

8. Assessment of the Incidence of Pinholes and Also the Film Thickness-Dependent Leveling 8.1 to Assess the Incidence of Pinholes and Also the Film Thickness-Dependent Leveling, Wedge-Format Multicoat Paint Systems are Produced in Accordance with the Following General Protocols (Variants A to C):

Variant A: Waterborne Basecoat Material as Wedge

A steel panel with dimensions of 30×50 cm, coated with a standard cathodic electrocoat (CathoGuard® 800 from BASF Coatings GmbH), is provided at one longitudinal edge with an adhesive strip (Tesaband, 19 mm), to allow determination of film thickness differences after coating. A waterborne basecoat material is applied electrostatically as a wedge with a target film thickness (film thickness of the dried material) of 0-40 µm. After a flash-off time of 4-5 minutes at room temperature (23° C.), the system is dried in a forced air oven at 60° C. for 10 minutes. Following removal of the adhesive strip, a commercial two-component clearcoat material (ProGloss® from BASF Coatings GmbH) is applied by gravity-fed spray gun, manually, to the dried waterborne basecoat film, with a target film thickness (film thickness of the dried material) of 40-45 µm. The resulting clearcoat film is flashed off at room temperature (23° C.) for 10 minutes. This is followed by curing in a forced air oven at 140° C. for a further 20 minutes.

Variant B: First Waterborne Basecoat Material as Wedge, Second Waterborne Basecoat Material as Constant Coat A steel panel with dimensions of 30×50 cm, coated with a standard cathodic electrocoat (CathoGuard® 800 from BASF Coatings) is provided at one longitudinal edge with two adhesive strips (Tesaband, 19 mm), to allow determination of film thickness differences after coating. A first waterborne basecoat material is applied electrostatically as a wedge with a target film thickness (film thickness of the dried material) of 0-30 µm. This is followed by flashing off at room temperature (23° C.) for 3 minutes, before, after removal of one of the two adhesive strips, a second waterborne basecoat material is applied, likewise electrostatically, in a single application. The target film thickness (film thickness of the dried material) is 13-16 µm. After a further flash-off time of 4 minutes at room temperature (23° C.), the system is dried in a forced air oven at 60° C. for 10 minutes. Following removal of the second adhesive strip, a commercial two-component clearcoat material (ProGloss® from BASF Coatings GmbH) is applied by gravity-fed spray gun, manually, to the dried waterborne basecoat films, with a target film thickness (film thickness of the dried material) of 40-45 µm. The resulting clearcoat film is flashed off at room temperature (23° C.) for 10 minutes. This is followed by curing in a forced air oven at 140° C. for a further 20 minutes.

Variant C: First Waterborne Basecoat Material as Constant Coat, Second Waterborne Basecoat Material as Wedge A steel panel with dimensions of 30×50 cm, coated with a standard cathodic electrocoat (CathoGuare 800 from BASF Coatings) is provided at one longitudinal edge with two adhesive strips (Tesaband, 19 mm), to allow determination of film thickness differences after coating. A first waterborne basecoat material is applied electrostatically with a target film thickness (film thickness of the dried material) of 18-22 µm. This is followed by flashing off at room temperature (23° C.) for 3 minutes, before, after removal of one of the two adhesive strips, the second waterborne basecoat material is applied, likewise electrostatically, in a single application, as a wedge. The target film thickness (film thickness of the dried material) is 0-30 µm. After a further flash-off time of 4 minutes at room temperature (23° C.), the system is dried in a forced air oven at 60° C. for 10 minutes. Following removal of the second adhesive strip, a commercial two-component clearcoat material (ProGloss® from BASF Coatings GmbH) is applied by gravity-fed spray gun, manually, to the dried waterborne basecoat films, with a target film thickness (film thickness of the dried material) of 40-45 µm. The resulting clearcoat film is flashed off at room temperature (23° C.) for 10 minutes. This is followed by curing in a forced air oven at 140° C. for a further 20 minutes.

8.2 Assessment of the Incidence of Pinholes

To assess the incidence of pinholes, multicoat paint systems are produced as per the methods in section 8.1 for the painting of waterborne basecoat wedge systems (Variant B and C, respectively), and are then evaluated visually according to the following general protocol:

The dry film thickness of the overall waterborne basecoat system, consisting of the first and second waterborne basecoat materials, is checked and, for the basecoat film thickness wedge, the 0-20 µm region and the region from 20 µm to the end of the wedge are marked on the steel panel. The pinholes are evaluated visually in the two separate regions of the waterborne basecoat wedge. The number of pinholes per region is counted. All results are standardized to an area of 200 $cm^2$. In addition, optionally, a record is made of that dry film thickness of the waterborne basecoat wedge from which pinholes no longer occur.

8.3 Assessment of the Film Thickness-Dependent Leveling

To assess the film thickness-dependent leveling, multicoat paint systems are produced as per the methods for the painting of waterborne basecoat wedge systems (Variant A, B, and C, respectively), and are then evaluated according to the following general protocol:

The dry film thickness of the overall waterborne basecoat system, consisting of the first and second waterborne basecoat materials, is checked and, for the basecoat film thickness wedge, at least one of the regions of 15-20 µm and also 20-25 µm and/or of 10-15 µm, 15-20 µm, 20-25 µm, 25-30 µm, and, optionally, 30-35 µm is marked on the steel panel. The film thickness-dependent leveling is determined and assessed by means of the Wave scan instrument from Byk/Gardner within the four basecoat film thickness ranges determined beforehand. For this purpose, a laser beam is directed at an angle of 60° onto the surface under analysis, and fluctuations in the reflected light in the shortwave range (0.3 to 1.2 mm) and in the longwave range (1.2 to 12 mm) are recorded by the instrument over a distance of 10 cm (long wave=LW; short wave=SW; the lower the values, the better the appearance). Furthermore, as a measure of the sharpness of an image reflected in the surface of the multicoat system, the instrument determines the characteristic variable "distinctness of image" (DOI) (the higher the value, the better the appearance).

9. Assessment of the Incidence of Pops and Runs

To determine the propensity toward popping and running of a sample, multicoat paint systems are produced in a method based on DIN EN ISO 28199-1 (date: January 2010) and DIN EN ISO 28199-3 (date: January 2010) in accordance with the following general procedure:

A perforated steel plate with dimensions of 57 cm×20 cm (according to DIN EN ISO 28199-1, section 8.1, version A), coated with a standard electrocoat material (CathoGuard® 800 from BASF Coatings GmbH), is prepared in analogy to DIN EN ISO 28199-1, section 8.2 (version A). This is followed, in a method based on DIN EN ISO 28199-2, section 8.3, by electrostatic application of a basecoat composition in a single application in the form of a wedge with a target film thickness (film thickness of the dried material) in the range from 0 µm to 40 µm. After a flash-off time at 18-23° C. of 10 minutes (run test) or without a prior flash-off time, the resulting waterborne basecoat film is dried in a forced air oven at 80° C. for 5 minutes. In the case of testing for runs, the steel plates are flashed off and dried vertically. The determination of the popping limit, i.e. of the basecoat film thickness from which pops occur, is made according to DIN EN ISO 28199-3, section 5. The determination of the running tendency is carried out according to DIN EN ISO 28199-3, section 4. As well as the film thickness at which a run exceeds a length of 10 mm from the bottom edge of the perforation, a determination is made of the film thickness above which an initial tendency to run can be observed visually at a perforation.

10. Assessment of the Incidence of Pigment Agglomerates

To assess the incidence of pigment agglomerates as a consequence of inadequate stabilization of the pigments in the paste that is used, a suitable sample, such as a waterborne basecoat material, is investigated according to the following general protocols:

a) Coating of a Glass Panel

The waterborne basecoat material in question is applied using a 150 µm bar coater to a glass panel with dimensions of 9×15 cm. In the wet state and also after a 60-minute flash-off time at room temperature (23° C.), the film is inspected for specks, by holding it against a light source, so as not to misinterpret any air inclusions as specks. A rating of 1-5 is awarded (1=no specks/5=very many specks) or an assessment is made relative to a reference (reference=0; ++=much better; +=better; −=poorer; −−=much poorer).

b) Coating of a Steel Panel

The waterborne basecoat material under investigation is applied by double application to a steel panel with dimensions of 32×60 cm that has already been coated with a surfacer system; application in the first step takes place electrostatically with a target film thickness of 8-9 µm, and in the second step, after a 2-minute flash-off time at room temperature (23° C.), application takes place pneumatically with a target film thickness of 4-5 µm. After a further flash-off time at room temperature (23° C.) of 5 minutes, the resulting waterborne basecoat film is subsequently dried in a forced air oven at 80° C. for 5 minutes. Over the dried waterborne basecoat film, a commercial two-component clearcoat material (ProGloss® from BASF Coatings GmbH) is applied with a target film thickness of 40-45 µm. The resulting clearcoat film is flashed off at room temperature (23° C.) for 10 minutes. This is followed by curing in a forced air oven at 140° C. for a further 20 minutes. Specks are evaluated visually; a rating of 1-5 is awarded (1=no specks/5=very many specks).

11. Visual Assessment of Separation

The sample under analysis, such as a pigment paste or a waterborne basecoat material, is assessed visually for its stability by storing the mixture in a sealed glass vessel at room temperature (23° C.) and/or at 40° C. over a period of at least four weeks. Examination then takes place to verify whether separation has taken place or whether the material has altered in its homogeneity. A rating of 1-5 is awarded (1=very stable; no separation or no formation of multiple phases/5=very unstable; severe separation or very distinct formation of multiple phases).

12. Determination of the Hiding Power

The hiding power is determined according to DIN EN ISO 28199-3 (January 2010; section 7).

13. Determination of the OH Number and the Acid Number

The OH number and the acid number are each determined by calculation.

Inventive and Comparative Examples

The inventive and comparative examples below serve to illustrate the invention, but should not be interpreted as limiting.

Unless otherwise stated, the figures in parts are parts by weight, and figures in percent are percentages by weight in each case.

1. Preparation of an Aqueous Dispersion AD1

1.1 the Meanings of the Components Identified Below and Used in Preparing the Aqueous Dispersion AD1 are as Follows:

| | |
|---|---|
| DMEA | dimethylethanolamine |
| DI water | deionized water |
| EF 800 | Aerosol ® EF-800, commercially available emulsifier from Cytec |
| APS | ammonium peroxodisulfate |
| 1,6-HDDA | 1,6-hexanediol diacrylate |
| 2-HEA | 2-hydroxyethyl acrylate |
| MMA | methyl methacrylate |

1.2 Preparation of the Aqueous Dispersion AD1 Comprising a Multistage SCS Polyacrylate Monomer Mixture (A), Stage i.

80 wt % of items 1 and 2 as per table 1.1 below are placed in a steel reactor (5 L volume) with reflux condenser and are heated to 80° C. The remaining fractions of the components listed under "Initial charge" in table 1.1 are premixed in a separate vessel. This mixture and, separately therefrom, the "Initiator solution" (table 1.1, items 5 and 6), are added dropwise to the reactor simultaneously over the course of 20 minutes, a fraction of the monomers in the reaction solution, based on the total amount of monomers used in stage i., not exceeding 6.0 wt % throughout the reaction time. 30 minutes of stirring follow.

Monomer Mixture (B), Stage ii.

The components indicated under "Mono 1" in table 1.1 are premixed in a separate vessel. This mixture is added dropwise to the reactor over the course of 2 hours, the fraction of the monomers in the reaction solution, based on the total amount of monomers used in stage ii., not exceeding 6.0 wt % throughout the reaction time. 1 hour of stirring follows.

Monomer Mixture (C), Stage iii.

The components indicated under "Mono 2" in table 1.1 are premixed in a separate vessel. This mixture is added dropwise to the reactor over the course of 1 hour, a fraction of the monomers in the reaction solution, based on the total amount of monomers used in stage iii., not exceeding 6.0 wt % throughout the reaction time. 2 hours of stirring follows.

Thereafter the reaction mixture is cooled to 60° C. and the neutralizing mixture (table 1.1, items 20, 21, and 22) is premixed in a separate vessel. The neutralizing mixture is added dropwise to the reactor over the course of 40 minutes, the pH of the reaction solution being adjusted to a pH of 7.5 to 8.5. The reaction product is subsequently stirred for 30 minutes more, cooled to 25° C., and filtered.

The solids content of the resulting aqueous dispersion AD1 was determined for reaction monitoring. The result, together with the pH and the particle size determined, is reported in table 1.2.

TABLE 1.1

Aqueous dispersion AD1 comprising a multistage polyacrylate

| | | AD1 |
|---|---|---|
| | Initial charge | |
| 1 | DI water | 41.81 |
| 2 | EF 800 | 0.18 |
| 3 | Styrene | 0.68 |
| 4 | n-Butyl acrylate | 0.48 |
| | Initiator solution | |
| 5 | DI water | 0.53 |
| 6 | APS | 0.02 |
| | Mono 1 | |
| 7 | DI water | 12.78 |
| 8 | EF 800 | 0.15 |
| 9 | APS | 0.02 |
| 10 | Styrene | 5.61 |
| 11 | n-Butyl acrylate | 13.6 |
| 12 | 1,6-HDDA | 0.34 |
| | Mono 2 | |
| 13 | DI water | 5.73 |
| 14 | EF 800 | 0.07 |
| 15 | APS | 0.02 |
| 16 | Methacrylic acid | 0.71 |
| 17 | 2-HEA | 0.95 |
| 18 | n-Butyl acrylate | 3.74 |
| 19 | MMA | 0.58 |
| | Neutralizing | |
| 20 | DI water | 6.48 |
| 21 | Butyl glycol | 4.76 |
| 22 | DMEA | 0.76 |

TABLE 1.2

Characteristics of the aqueous dispersion AD1 or of the polymer comprised

| | AD1 |
|---|---|
| Solids content [wt %] | 25.6 |
| pH | 8.85 |
| Particle size [nm] | 246 |

2. Preparation of Thickeners 2.1 Polyamide Thickener V1

22.5 parts of an aqueous dispersion of a polyester prepared as per example D, column 16, lines 37-59 of DE 40 09 858 A1, 0.45 part of dimethylethanolamine, 3 parts of 2,4,7,9-tetramethyl-5-decynediol, 52% in butyl glycol (available from BASF SE), 3 parts of Lipotin® A (available from Evonik Industries AG), 56.05 parts of deionized water, and 15 parts of Disparlon® A670-20M (available from Kusomoto Chemicals, Ltd.) are stirred together to form a mixture at a temperature of 15-25° C. This mixture is subsequently homogenized at the aforementioned temperature with stirring over a time of 10 minutes by means of the Dispermat® LC30 apparatus from VWA-Getzmann, Germany, at a peripheral speed of the stirrer disk used of 15 to 20 m/s, with stirring.

2.2 Polyamide Thickener V2

17.63 parts of an aqueous dispersion of a polyester prepared as per example D, column 16, lines 37-59 of DE 40 09 858 A1, 24.52 parts of a melamine-formaldehyde resin (Cymel® 303 from Allnex), 0.33 part of dimethylethanolamine, 12.79 parts of 2,4,7,9-tetramethyl-5-decynediol, 52% in butyl glycol (available from BASF SE), 29.82 parts of butyl glycol, and 14.91 parts of Disparlon® A670-20M (available from Kusomoto Chemicals, Ltd.) are stirred together to form a mixture at a temperature of 15-25° C. This mixture is subsequently homogenized at the aforementioned temperature with stirring over a time of 10 minutes by means of the Dispermat® LC30 apparatus from VWA-Getzmann, Germany, at a peripheral speed of the stirrer disk used of 15 to 20 m/s, with stirring.

3. Preparation of Pigment Pastes and Surfacer Pastes 3.1 Preparation of a Noninventive White Paste wP1

The white paste is prepared from 50 parts by weight of titanium rutile 2310, 6 parts by weight of a polyester prepared as per example D, column 16, lines 37-59 of DE 40 09 858 A1, 24.7 parts by weight of a polyurethane dispersion prepared as per patent EP 0 228 003 B2, page 8, lines 6 to 18, 10.5 parts by weight of deionized water, 4 parts by weight of 2,4,7,9-tetramethyl-5-decynediol, 52% in butyl glycol (available from BASF SE), 4.1 parts by weight of butyl glycol, 0.4 part by weight of 10% dimethylethanolamine in water, and 0.3 part by weight of Acrysol® RM-8 (available from The Dow Chemical Company).

3.2 Preparation of an Inventive White Paste wP2

The white paste is prepared from 34 parts by weight of titanium rutile 2310, 43.3 parts by weight of the aqueous dispersion AD1 described in section 1., 16.7 parts by weight of deionized water, 2.1 parts by weight of Disperbyk® 184 (available from BYK-Chemie GmbH), and 3.9 parts by weight of butyl glycol.

3.3 Preparation of a Noninventive White Paste wP3

The white paste is prepared from 44.26 parts by weight of titanium rutile 2310, 9.93 parts by weight of a melamine-formaldehyde resin (Cymel® 203 from Allnex), 10.95 parts by weight of a polyester prepared as per example D, column 16, lines 37-59 of DE 40 09 858 A1, 5.32 parts by weight of a polyurethane-modified polyacrylate prepared as per page 7, line 55 to page 8, line 23 of DE 4437535 A1, 21.73 parts by weight of deionized water, 2.73 parts by weight of Disperbyk® 184 (available from BYK-Chemie GmbH) and 5.08 parts by weight of butyl glycol.

3.4 Preparation of a Black Paste sP1

The black paste is prepared from 57 parts by weight of a polyurethane dispersion prepared as per WO 92/15405 A1, page 14, line 13 to page 15, line 13, 10 parts by weight of carbon black (Monarch® 1400 from Cabot Corporation), 5 parts by weight of polyester prepared as per example D, column 16, lines 37-59 of DE 40 09 858 A1, 6.5 parts by weight of 10% strength aqueous dimethylethanolamine solution, 2.5 parts by weight of a commercial polyether (Pluriol® P900, available from BASF SE), 7 parts by weight of butyl diglycol, and 12 parts by weight of deionized water.

3.5 Preparation of a Yellow Paste gP1

The yellow paste is prepared from 37 parts by weight of Bayferrox® 3910 (available from Lanxess), 49.5 parts by weight of an aqueous binder dispersion prepared as per WO 91/15528 A1, page 23, line 26 to page 24, line 24, 7.5 parts by weight of Disperbyk®-184 (available from BYK-Chemie GmbH), and 6 parts by weight of deionized water.

3.6 Preparation of a Yellow Paste gP2

The yellow paste is prepared from 47 parts by weight of Sicotan Yellow L 1912, 45 parts by weight of an aqueous binder dispersion prepared as per WO 91/15528 A1, page 23, line 26 to page 24, line 24, 2.7 parts by weight of 1-propoxy-2-propanol, 2.8 parts by weight of deionized water, 1.5 parts by weight of Disperbyk®-184 (available from BYK-Chemie GmbH), and 1 part by weight of Aerosil® R 972 (available from Evonik Industries).

3.7 Preparation of a Barium Sulfate Paste BSP1

The barium sulfate paste is prepared from 39 parts by weight of a polyurethane dispersion prepared as per EP 0 228 003 B2, page 8, lines 6 to 18, 54 parts by weight of barium sulfate (Blanc fixe micro from Sachtleben Chemie GmbH), 3.7 parts by weight of butyl glycol, and 0.3 part by weight of Agitan® 282 (available from Münzing Chemie GmbH), and 3 parts by weight of deionized water.

3.8 Preparation of a Talc Paste TP1

The talc paste is prepared from 49.7 parts by weight of an aqueous binder dispersion prepared as per WO 91/15528, page 23, line 26 to page 24, line 24, 28.9 parts by weight of steatite (Microtalc IT extra from Mondo Minerals B.V.), 0.4 part by weight of Agitan® 282 (available from Münzing Chemie GmbH), 1.45 parts by weight of Disperbyk®-184 (available from BYK-Chemie GmbH), 3.1 parts by weight of a commercial polyether (Pluriol® P900, available from BASF SE), and 16.45 parts by weight of deionized water.

4. Production of Aqueous Basecoat Materials 4.1 Production of a Noninventive Waterborne Basecoat Material WBL A1 and of an Inventive Waterborne Basecoat Material WBL A2

The components listed under "aqueous phase" in table 4.1 are stirred together in the order stated to form an aqueous mixture. Stirring takes place then for 10 minutes, and deionized water and dimethylethanolamine are used to set a pH of 8.1±0.2 and a spray viscosity of 95±5 mPa·s under a shearing load of 1000 s$^{-1}$, measured using a rotational viscometer (Rheolab QC with C-LTD80/QC heating system from Anton Paar) at 23° C.

TABLE 4.1

Production of waterborne basecoat materials WBL A1 and WBL A2

| Aqueous phase: | WBL A1 | WBL A2 |
|---|---|---|
| 3% Na Mg phyllosilicate solution | 15.23 | 15.23 |
| 1-Propoxy-2-propanol | 1.41 | 1.41 |
| 2-Ethylhexanol | 0.87 | 0.87 |
| Aqueous binder dispersion AD1 | 31.23 | 21.48 |

TABLE 4.1-continued

Production of waterborne basecoat materials WBL A1 and WBL A2

| Aqueous phase: | WBL A1 | WBL A2 |
|---|---|---|
| Polyester prepared as per example D, column 16, lines 37-59 of DE 40 09 858 A1 | 4.85 | 6.00 |
| Melamine-formaldehyde resin (Cymel ® 203 from Allnex) | 5.44 | 5.44 |
| 10% dimethylethanolamine in water | 0.30 | 0.30 |
| 2,4,7,9-Tetramethyl-5-decynediol, 52% in butyl glycol | 1.09 | 1.09 |
| Triisobutyl phosphate | 1.63 | 1.63 |
| Polyurethane-modified polyacrylate prepared as per page 7, line 55 to page 8, line 23 of DE 4437535 A1 | 2.91 | 2.91 |
| Butyl glycol | 4.35 | 4.35 |
| Isopar ® L, available from Exxon Mobil | 1.84 | 1.84 |
| Pluriol ® P900, available from BASF SE | 0.54 | 0.54 |
| Hydrosol A170, available from DHC Solvent Chemie GmbH | 0.54 | 0.54 |
| White paste wP1 (noninventive) | 25.68 | — |
| White paste wP2 (inventive) | — | 37.76 |
| Black paste sP1 | 1.52 | 1.52 |
| Yellow paste gP1 | 0.54 | 0.54 |

4.2 Production of a Noninventive Waterborne Basecoat Material WBL A3 and of an Inventive Waterborne Basecoat Material WBL A4

The components listed under "aqueous phase" in table 4.2 are stirred together in the order stated to form an aqueous mixture. Stirring takes place then for 10 minutes, and deionized water and dimethylethanolamine are used to set a pH of 8.1±0.2 and a spray viscosity of 90-110 mPa·s under a shearing load of 1000 s$^{-1}$, measured using a rotational viscometer (Rheolab QC with C-LTD80/QC heating system from Anton Paar) at 23° C.

TABLE 4.2

Production of waterborne basecoat materials WBL A3 and WBL A4

| Aqueous phase: | WBL A3 | WBL A4 |
|---|---|---|
| 3% Na Mg phyllosilicate solution | 11.98 | 11.79 |
| Deionized water | 8.91 | 6.48 |
| 1-Propoxy-2-propanol | 1.33 | 1.31 |
| 2-Ethylhexanol | 0.82 | 0.81 |
| Aqueous binder dispersion AD1 | 33.00 | 19.89 |
| Polyester prepared as per example D, column 16, lines 37-59 of DE 40 09 858 A1 | 4.57 | 5.56 |
| Melamine-formaldehyde (Resimene ® 755 from Ineos) | 3.69 | 2.42 |
| Melamine-formaldehyde (Cymel ® 203 from Allnex) | — | 1.68 |
| 10% dimethylethanolamine in water | 0.28 | 0.28 |
| 2,4,7,9-Tetramethyl-5-decynediol, 52% in butyl glycol | 1.02 | 1.01 |
| Triisobutyl phosphate | — | 1.51 |
| Polyurethane-modified polyacrylate prepared as per page 7, line 55 to page 8, line 23 of DE 4437535 A1 | — | 2.70 |
| Butanol | 1.43 | 0.94 |
| Butyl glycol | 4.10 | 4.03 |
| Isopar ® L, available from Exxon Mobil | 1.73 | 1.71 |
| Pluriol ® P900, available from BASF SE | 0.51 | 0.50 |
| Hydrosol A170 (DHC Solvent Chemie GmbH) | 0.51 | 0.50 |
| White paste wP1 (noninventive) | 24.17 | — |
| White wP2 (inventive) | — | 34.97 |
| Black paste sP1 | 1.43 | 1.41 |
| Yellow paste gP1 | 0.51 | 0.50 |
| Total: | 100.00 | 100.00 |

4.3 Production of a Noninventive Waterborne Basecoat Material WBL B1 and of an Inventive Waterborne Basecoat Material WBL B2

The components listed under "aqueous phase" in table 4.3 are stirred together in the order stated to form an aqueous mixture. Stirring takes place then for 10 minutes, and deionized water and dimethylethanolamine are used to set a pH of 8 and a spray viscosity of 90-100 mPa·s under a shearing load of 1000 $s^{-1}$, measured using a rotational viscometer (Rheolab QC with C-LTD80/QC heating system from Anton Paar) at 23° C.

TABLE 4.3

Production of waterborne basecoat materials WBL B1 and WBL B2

| Aqueous phase: | WBL B1 | WBL B2 |
|---|---|---|
| Thickener V1 | 17.16 | 17.40 |
| Deionized water | 6.25 | 2.01 |
| 1-Propoxy-2-propanol | 1.21 | 1.25 |
| 2-Ethylhexanol | 0.75 | 0.75 |
| Aqueous binder dispersion AD1 | 25.09 | 15.80 |
| Polyester prepared as per example D, column 16, lines 37-59 of DE 40 09 858 A1 | 0.24 | 2.20 |
| Melamine-formaldehyde (Resimene ® 755 from Ineos) | 3.36 | 3.50 |
| 2,4,7,9-Tetramethyl-5-decynediol, 52% in butyl glycol | 0.94 | 0.95 |
| Pluriol ® P900, available from BASF SE | 0.47 | 0.50 |
| Triisobutyl phosphate | 1.40 | 1.40 |
| Polyurethane-modified polyacrylate prepared as per page 7, line 55 to page 8, line 23 of DE 4437535 A1 | 3.13 | — |
| Butanol | 1.31 | — |
| Isopar ® L, available from Exxon Mobil | 1.58 | 1.60 |
| Butyl glycol | 3.73 | 3.79 |
| Hydrosol A170, available from DHC Solvent Chemie GmbH | 0.47 | 0.45 |
| White paste wP1 (noninventive) | 31.69 | — |
| White paste wP2 (inventive) | — | 47.15 |
| Yellow paste gP2 | 0.10 | 0.11 |
| Black paste sP1 | 0.10 | 0.10 |
| Tinuvin ® 123, available from BASF SE | 0.34 | 0.35 |
| Tinuvin ® 384-2, available from BASF SE | 0.69 | 0.70 |
| Total: | 100.00 | 100.00 |

4.4 Production of a Noninventive Waterborne Basecoat Material WBL B3

The components listed under "aqueous phase" in table 4.4 are stirred together in the order stated to form an aqueous mixture. Stirring takes place then for 10 minutes, and deionized water and dimethylethanolamine are used to set a pH of 8 and a spray viscosity of 90±5 mPa·s under a shearing load of 1000 $s^{-1}$, measured using a rotational viscometer (Rheolab QC with C-LTD80/QC heating system from Anton Paar) at 23° C.

TABLE 4.4

Production of the waterborne basecoat material WBL B3

| Aqueous phase: | WBL B3 |
|---|---|
| Thickener V2 | 15.09 |
| Deionized water | 17.40 |
| n-Propanol | 0.79 |
| n-Butoxypropanol | 1.24 |
| 2-Ethylhexanol | 2.49 |
| Aqueous binder dispersion AD1 | 41.00 |
| BYK-346, available from BYK-Chemie GmbH | 0.41 |
| Isopropanol | 1.48 |
| Butyl glycol | 0.90 |
| Isopar ® L, available from Exxon Mobil | 0.79 |
| Black paste sP1 | 12.60 |
| Barium sulfate paste BSP1 | 2.88 |
| Talc paste TP1 | 2.93 |
| Total: | 100.00 |

4.5 Production of a Noninventive Waterborne Basecoat

The components listed under "aqueous phase" in table 4.5 are stirred together in the order stated to form an aqueous mixture. In the next step, an organic mixture is produced from the components listed under "organic phase". The organic mixture is added to the aqueous mixture. Stirring takes place then for 10 minutes, and deionized water and dimethylethanolamine are used to set a pH of 8 and a spray viscosity of 85-90 mPa·s under a shearing load of 1000 $s^{-1}$, measured using a rotational viscometer (Rheolab QC with C-LTD80/QC heating system from Anton Paar) at 23° C.

TABLE 4.5

Production of the waterborne basecoat material WBL B4

| | WBL B4 |
|---|---|
| Aqueous phase: | |
| 3% Na Mg phyllosilicate solution | 20.70 |
| Deionized water | 12.50 |
| 1-Propoxy-2-propanol | 2.20 |
| n-Butoxypropanol | 1.65 |
| Isopropanol | |
| 2-Ethylhexanol | 2.50 |
| Aqueous binder dispersion AD1 | 26.00 |
| Polyester prepared as per example D, column 16, lines 37-59 of DE 40 09 858 A1 | 2.60 |
| 3 wt % strength aqueous Rheovis ® AS 1130 solution, available from BASF SE | 6.50 |
| Melamine-formaldehyde (Resimene ® 755 from Ineos) | 2.30 |
| 10% dimethylethanolamine in water | 0.50 |
| Pluriol ® P900, available from BASF SE | 1.00 |
| Polyurethane-modified polyacrylate prepared as per page 7, line 55 to page 8, line 23 of DE 4437535 A1 | 3.80 |
| Isobutanol | 2.80 |
| 50 wt % strength solution of Rheovis ® PU1250 in butyl glycol | 0.50 |
| Tinuvin ® 384-2, available from BASF SE | 0.80 |
| Tinuvin ® 123, available from BASF SE | 0.40 |
| Byketol ®-WS from BYK-Chemie GmbH | 1.00 |
| Organic phase: | |
| Mixture of two commercial aluminum pigments, available from Altana-Eckart (Alu Stapa Hydrolux 2192 & 2197 in a ratio of 2.4:1.0) | 4.55 |
| Butyl glycol | 5.60 |
| Polyester prepared as per example D, column 16, lines 37-59 of DE 40 09 858 A1 | 1.90 |
| 10% dimethylethanolamine in water | 0.20 |
| Total: | 100.00 |

4.6 Production of a Noninventive Waterborne Basecoat Material WBL A2a with the Same Overall Composition as in Inventive Waterborne Basecoat Material WBL A2

As a direct comparison to the inventive waterborne basecoat material WBL A2 (production see 4.1), a noninventive waterborne basecoat material WBL A2a was produced, having an identical overall composition to WBL A2, but differing in the mode of production, i.e., in the use of white paste. The formulations of WBL A2 and WBL A2a are contrasted with one another in table 4.6.

For the production of WBL A2, the inventive white paste wP2 was used, this paste containing the inventively employed polymer (b) as a result of the use of dispersion AD1. For the production of WBL A2a, in contrast, the noninventive white paste wP3 was used, that does not contain said polymer (b). In wP3, in comparison to wP2, the fraction of the polymer (b) present in wP2 was replaced by the binder components included in WBL A2 (melamine-formaldehyde resin, polyester, and polyurethane-modified polyacrylate). The amount of polymer (b) used separately was raised accordingly in the production of WBL A2a, but the fraction of the remaining binder components was reduced accordingly, so that both formulas had an exactly identical overall composition.

The production of WBL A2a took place in the same way as for WBL A2 (see 4.1); deionized water and dimethylethanolamine are used to set a pH of 8 and a spray viscosity of 95±5 mPa·s under a shearing load of $1000\ s^{-1}$, measured using a rotational viscometer (Rheolab QC with C-LTD80/QC heating system from Anton Paar) at 23° C.

TABLE 4.6

Production of the waterborne basecoat material
WBL A2 (inventive) and WBL A2a (noninventive)

| Aqueous phase: | WBL A2a | WBL A2 |
|---|---|---|
| 3% Na Mg phyllosilicate solution | 15.23 | 15.23 |
| 1-Propoxy-2-propanol | 1.41 | 1.41 |
| 2-Ethylhexanol | 0.87 | 0.87 |
| Aqueous binder dispersion AD1 | 37.83 | 21.48 |
| Polyester prepared as per example D, column 16, lines 37-59 of DE 40 09 858 A1 | 2.82 | 6.00 |
| Melamine-formaldehyde resin (Cymel ® 203 from Allnex) | 2.56 | 5.44 |
| 10% dimethylethanolamine in water | 0.30 | 0.30 |
| 2,4,7,9-Tetramethyl-5-decynediol, 52% in butyl glycol | 1.09 | 1.09 |
| Triisobutyl phosphate | 1.63 | 1.63 |
| Polyurethane-modified polyacrylate prepared as per page 7, line 55 to page 8, line 23 of DE 4437535 A1 | 1.37 | 2.91 |
| Butyl glycol | 4.35 | 4.35 |
| Isopar ® L, available from Exxon Mobil | 1.84 | 1.84 |
| Pluriol ® P900, available from BASF SE | 0.54 | 0.54 |
| Hydrosol A170, available from DHC Solvent Chemie GmbH | 0.54 | 0.54 |
| White paste wP3 (noninventive) | 29.01 | — |
| White paste wP2 (inventive) | — | 37.76 |
| Black paste sP1 | 1.52 | 1.52 |
| Yellow paste gP1 | 0.54 | 0.54 |
| Total: | 103.45 | 103.45 |

5. Studies and Comparison of the Properties of the Aqueous Basecoat Materials and of the Coatings Obtained from them 5.1 Comparison Between WBL A1 and WBL A2

The investigations on the noninventive waterborne basecoat material WBL A1 and on the inventive waterborne basecoat material WBL A2 (comprising an inventive pigment paste based on polymer (b)) for storage stability, pops, runs, pinholes, incidence of specks, separation tendency, and film thickness-dependent leveling took place in accordance with the method described above. Tables 5.1 to 5.5 summarize the results.

TABLE 5.1

Results of storage stability investigations

| | | Waterborne basecoat material | |
|---|---|---|---|
| | | WBL A1 | WBL A2 |
| Low-shear viscosity (1 $s^{-1}$) in mPa · s | fresh | 1306.3 | 2684.6 |
| | after 2 weeks' storage at 40° C. | 757.4 | 2649.6 |
| | Change [%] | −42% | −1% |
| High-shear-viscosity (1000 $s^{-1}$) in mPa · s | fresh | 98.5 | 98.5 |
| | after 2 weeks' storage at 40° C. | 88.6 | 110.2 |
| | Change [%] | −10% | 12% |

TABLE 5.2

Results for separation tendency and pigment
agglomerates (specks) investigations

| | Waterborne basecoat material | |
|---|---|---|
| | WBL A1 | WBL A2 |
| Visual evaluation of separation | 2-3 | 1 |
| Visual evaluation of incidence of pigment agglomerates | | |
| on glass panels: | 1 | 1 |
| on metal panels: | 1 | 1 |

TABLE 5.3

Results for tendency toward pops and runs investigations

| | Waterborne basecoat material | |
|---|---|---|
| | WBL A1 | WBL A2 |
| Start of runs (>0 mm) [µm] | >30 | >30 |
| Popping limit [µm] | >30 | >30 |

TABLE 5.4

Results for pinholes investigations
Number of pinholes (standardized to 200 $cm^2$):

| Film thickness range, basecoat (Wedge coating as per Variant A) | WBL A1 | WBL A2 |
|---|---|---|
| 0-20 µm | 0 | 0 |
| 20 µm-End of wedge | 0 | 0 |
| Total | 0 | 0 |

TABLE 5.5

Results for film thickness-dependent leveling
(coating as per Variant A) investigations

| | Film thickness range | Waterborne basecoat material | |
|---|---|---|---|
| Appearance | (Coating of wedge as per Variant A) | WBL A1 | WBL A2 |
| SW | 10 µm-15 µm | 24.0 | 16.5 |
| | 15 µm-20 µm | 18.0 | 17.5 |
| | 20 µm-25 µm | 19.9 | 18.9 |
| | 25 µm-30 µm | 24.4 | 21.6 |
| | 30 µm-35 µm | 30.9 | 23.4 |

TABLE 5.5-continued

Results for film thickness-dependent leveling
(coating as per Variant A) investigations

| | Film thickness range | Waterborne basecoat material | |
|---|---|---|---|
| Appearance | (Coating of wedge as per Variant A) | WBL A1 | WBL A2 |
| LW | 10 μm-15 μm | 4.8 | 3.5 |
| | 15 μm-20 μm | 4.3 | 3.8 |
| | 20 μm-25 μm | 4.7 | 3.7 |
| | 25 μm-30 μm | 5.8 | 4.5 |
| | 30 μm-35 μm | 7.9 | 4.9 |
| DOI | 10 μm-15 μm | 88.5 | 90.9 |
| | 15 μm-20 μm | 91.3 | 90.3 |
| | 20 μm-25 μm | 90.1 | 88.8 |
| | 25 μm-30 μm | 88.1 | 86.7 |
| | 30 μm-35 μm | 83.3 | 84.7 |

WBL A1 and WBL A2 each have very good pinhole robustness and give results of comparable quality in terms of pops and runs. Using the inventive white paste wP2 in the waterborne basecoat material WBL A2 leads to an improvement in storage stability by comparison with WBL A1, which contains the noninventive white paste wP1; in the case of WBL A2, the viscosity level in the low-shear range shows hardly any change as a result of oven storage, whereas for WBL A1 a significant drop in the low-shear viscosity is measured. In association with this, for WBL A2, a distinctly low tendency toward phase separation on oven storage is found. Furthermore, relative to WBL A1, WBL A2 is notable for better film thickness-dependent leveling.

5.2 Comparison Between WBL B1 and WBL B2 and Also Between WBL A3/WBL B1 and WBL A4/WBL B2

The investigations on waterborne basecoat materials WBL B1 and WBL B2 and on multicoat systems using the waterborne basecoat materials WBL A3 and WBL B1 (in each case not inventive) and WBL A4 and WBL B2 (in each case inventive) for hiding power, runs, pinholes, and film thickness-dependent leveling took place in accordance with methods described above. The results are summarized in tables 5.6 to 5.9.

TABLE 5.6

Results for hiding power and runs investigations

| | Waterborne basecoat material | |
|---|---|---|
| | WBL B1 | WBL B2 |
| Hiding power [μm] | 24 | 21 |
| Start of runs (>0 mm) [μm] | 9 | 15 |
| Running limit (>10 mm) [μm] | 18 | 23 |

TABLE 5.7

Results for pinholes investigations
Number of pinholes (standardized to 200 cm²):
Coating as per Variant C

| | WBL A3 | WBL A4 |
|---|---|---|
| Coating with 1st waterborne basecoat material constant | | |
| Coating with 2nd waterborne basecoat material as wedge | WBL B1 | WBL B2 |

TABLE 5.7-continued

Results for pinholes investigations
Number of pinholes (standardized to 200 cm²):
Coating as per Variant C

| Film thickness range | Overall basecoat film (Waterborne basecoat material 1 + Waterborne basecoat material 2) | |
|---|---|---|
| 0-20 μm | 1 | 0 |
| 20 μm-End of wedge | 1 | 0 |
| Total | 2 | 0 |

TABLE 5.8

Results for film thickness-dependent leveling
(coatings as per Variant B) investigations
Coating as per Variant B

| Coating with 1st waterborne basecoat material as wedge | | WBL A3 | WBL A4 |
|---|---|---|---|
| Coating with 2nd waterborne basecoat material constant | | WBL B1 | WBL B2 |
| Appearance | Film thickness range 1st basecoat | WBL A3 | WBL A4 |
| SW | 5 μm-10 μm | 13.6 | 10.5 |
| | 10 μm-15 μm | 16.4 | 13.3 |
| | 15 μm-20 μm | 19.8 | 13.9 |
| | 20 μm-25 μm | 23.7 | 16.2 |
| | 25 μm-30 μm | 26.1 | 17.5 |
| LW | 5 μm-10 μm | 4.0 | 4.6 |
| | 10 μm-15 μm | 4.9 | 5.3 |
| | 15 μm-20 μm | 6.0 | 5.6 |
| | 20 μm-25 μm | 6.6 | 6.0 |
| | 25 μm-30 μm | 7.3 | 5.3 |
| DOI | 5 μm-10 μm | 90.8 | 93.5 |
| | 10 μm-15 μm | 86.5 | 91.7 |
| | 15 μm-20 μm | 82.0 | 91.6 |
| | 20 μm-25 μm | 81.4 | 89.8 |
| | 25 μm-30 μm | 81.1 | 89.4 |

TABLE 5.9

Results for film thickness-dependent leveling
(coatings as per Variant C) investigations
Coating as per Variant C

| Coating with 1st waterborne basecoat material constant | | WBL A3 | WBL A4 |
|---|---|---|---|
| Coating with 2nd waterborne basecoat material as wedge | | WBL B1 | WBL B2 |
| Appearance | Film thickness range 2nd basecoat | WBL B1 | WBL B2 |
| SW | 5 μm-10 μm | 21.6 | 19.9 |
| | 10 μm-15 μm | 21.7 | 17.2 |
| | 15 μm-20 μm | 23.7 | 18.1 |
| | 20 μm-25 μm | 21.8 | 17.0 |
| | 25 μm-30 μm | 23.5 | 16.4 |
| LW | 5 μm-10 μm | 6.0 | 4.9 |
| | 10 μm-15 μm | 5.4 | 5.3 |
| | 15 μm-20 μm | 5.2 | 5.4 |
| | 20 μm-25 μm | 5.5 | 5.1 |
| | 25 μm-30 μm | 5.9 | 6.6 |
| DOI | 5 μm-10 μm | 80.6 | 87.3 |
| | 10 μm-15 μm | 79.9 | 87.0 |
| | 15 μm-20 μm | 79.2 | 87.3 |
| | 20 μm-25 μm | 81.3 | 89.0 |
| | 25 μm-30 μm | 81.4 | 89.8 |

The results demonstrate that by using the inventive white paste wP2 it is possible to exert a significantly positive influence over the leveling. Furthermore, in comparison to the noninventive multicoat system (using WBL A3 and WBL B1), a slightly better pinhole robustness is found. Waterborne basecoat material WBL B2, containing the inventive white paste wP2 based on a multistage polyacrylate, not only has better running resistance than the reference WBL B1, by comparison, but is also notable for better hiding power.

5.3 Comparison Between WBL A3/WBL B3 and WBL A4/WBL B3

The investigations on the multicoat systems using the waterborne basecoat materials WBL A3 and WBL B3 (noninventive) and, respectively, WBL A4 and WBL B3 (inventive) for film thickness-dependent leveling took place in accordance with the methods described above. The results are summarized in tables 5.10 and 5.11.

TABLE 5.10

Results for film thickness-dependent leveling
(coatings as per Variant B) investigations
Coating as per Variant B

| Coating with 1st waterborne basecoat material as wedge | WBL A3 | WBL A4 |
|---|---|---|
| Coating with 2nd waterborne basecoat material constant | WBL B3 | WBL B3 |

| Appearance | Film thickness range 1st basecoat | WBL A3 | WBL A4 |
|---|---|---|---|
| SW | 5 µm-10 µm | 10.6 | 10.2 |
|  | 10 µm-15 µm | 11.0 | 11.3 |
|  | 15 µm-20 µm | 13.5 | 12.2 |
|  | 20 µm-25 µm | 15.7 | 13.8 |
| DOI | 5 µm-10 µm | 96.2 | 95.5 |
|  | 10 µm-15 µm | 95.7 | 95.3 |
|  | 15 µm-20 µm | 94.4 | 94.7 |
|  | 20 µm-25 µm | 93.1 | 93.6 |

TABLE 5.11

Results for film thickness-dependent leveling
(coatings as per Variant C) investigations
Coating as per Variant C

| Coating with 1st waterborne basecoat material constant | WBL A3 | WBL A4 |
|---|---|---|
| Coating with 2nd waterborne basecoat material as wedge | WBL B3 | WBL B3 |

| Appearance | Film thickness range 2nd basecoat | WBL B3 | WBL B3 |
|---|---|---|---|
| SW | 5 µm-10 µm | 16.4 | 13.4 |
|  | 10 µm-15 µm | 17.4 | 13.0 |
|  | 15 µm-20 µm | 18.1 | 14.0 |
|  | 20 µm-25 µm | 18.5 | 13.1 |
|  | 25 µm-30 µm | 18.9 | 14.0 |
| DOI | 5 µm-10 µm | 89.1 | 93.1 |
|  | 10 µm-15 µm | 88.4 | 94.3 |
|  | 15 µm-20 µm | 88.0 | 93.8 |
|  | 20 µm-25 µm | 89.2 | 94.2 |
|  | 25 µm-30 µm | 90.2 | 93.4 |

The results show that using the inventive white paste wP2 containing the multistage polyacrylate AD1 brings advantages in leveling relative to the reference pastes used. This is particularly evident in the context of the short wave (SW), particularly at higher film thicknesses, and also in the distinctness of image (DOI) across the whole of the film thickness range.

5.4 Comparison Between WBL A3/WBL B4 and WBL A4/WBL B4

The investigations on the multicoat systems using the waterborne basecoat materials WBL A3 and WBL B4 (noninventive) and, respectively, WBL A4 and WBL B4 (inventive) for incidence of pinholes took place in accordance with the methods described above. The results are summarized in table 5.12

TABLE 5.12

Results for incidence of pinholes investigations
Number of pinholes (standardized to 200 cm$^2$):
Coating as per Variant C

| Coating with 1st waterborne basecoat material constant | WBL A3 | WBL A4 |
|---|---|---|
| Coating with 2nd waterborne basecoat material as wedge | WBL B4 | WBL B4 |
| Film thickness range Overall basecoat film (Waterborne basecoat material 1 + Waterborne basecoat material 2) | | |
| 0-20 µm | 0 | 1 |
| 20 µm-End of wedge | 18 | 0 |
| Total | 18 | 1 |

Using the inventive white paste wP2 in the multicoat system employing waterborne basecoat materials WBL A4 and WBL B4 leads to significantly better pinhole robustness as compared with the reference.

5.5 Comparison Between Noninventive Waterborne Basecoat Material WBL A2a and Inventive Waterborne Basecoat Material WBL A2 in Relation to Film Thickness-Dependent Leveling The results of these investigations on waterborne basecoat materials WBL A2a (noninventive) and WBL A2 (inventive), which took place according to the method described above, are summarized in table 5.13 below.

TABLE 5.13

Results for film thickness-dependent leveling investigations

| | Film thickness range | Waterborne basecoat material | |
|---|---|---|---|
| Appearance | (Coating of wedge as per Variant A) | WBL A2 | WBL A2a |
| LW | 10 µm-15 µm | 3.5 | 8.7 |
|  | 15 µm-20 µm | 3.8 | 8.3 |
|  | 20 µm-25 µm | 3.7 | 9.7 |
|  | 25 µm-30 µm | 4.5 | 9.7 |
| DOI | 10 µm-15 µm | 90.9 | 90.5 |
|  | 15 µm-20 µm | 90.3 | 88.5 |
|  | 20 µm-25 µm | 88.8 | 84.8 |
|  | 25 µm-30 µm | 86.7 | 84.7 |

The results show that waterborne basecoat material WBL A2, produced using an inventive color pigment paste (wP2), in comparison to a waterborne basecoat material of the same composition (WBL A2a) produced using a noninventive color pigment paste (wP3), has different and, in particular, advantageous properties in relation to long wave (LW) and DOI and hence in relation to appearance. These results show that as a result only of the production procedure, WBL A2 has different properties from WBL A2a.

The invention claimed is:

1. An aqueous pigment paste comprising:
    (a) at least one color pigment, and
    (b) at least one polymer having an average particle size in a range from 100 to 500 nm, prepared by successive radical emulsion polymerization of three monomer mixtures (A), (B), and (C) of olefinically unsaturated monomers in water, wherein the mixtures (A), (B), and (C) are different from one another, and wherein:
the mixture (A) comprises at least 50 wt % of monomers having a solubility in water of less than 0.5 g/l at 25° C., and a polymer prepared from the mixture (A) possesses a glass transition temperature of 10 to 65° C.,
the mixture (B) comprises at least one polyunsaturated monomer, and a polymer prepared from the mixture (B) possesses a glass transition temperature of −35 to 15° C., and
a polymer prepared from the mixture (C) possesses a glass transition temperature of −50 to 15° C.,
and wherein:
in stage i. first the mixture (A) is polymerized,
in stage ii. then the mixture (B) is polymerized in the presence of the polymer prepared under stage i, and
in stage iii. thereafter the mixture (C) is polymerized in the presence of the polymer prepared under stage ii.

2. The pigment paste as claimed in claim 1, which comprises the at least one color pigment (a) in an amount of at least 5 wt %, based on a total weight of the pigment paste.

3. The pigment paste as claimed in claim 1, wherein the at least one color pigment (a) comprises a white pigment.

4. The pigment paste as claimed in claim 1, wherein the at least one color pigment (a) comprises titanium dioxide.

5. The pigment paste as claimed in claim 1, wherein a relative weight ratio of the at least one color pigment (a) to the polymer (b) in the pigment paste is in a range from 10:1 to 1:10.

6. The pigment paste as claimed in claim 1, which comprises the polymer (b) in an amount in a range from 1.5 to 20 wt %, based on a total weight of the pigment paste.

7. The pigment paste as claimed in claim 1, wherein a fraction of the mixture (A) used for preparing the polymer (b) is from 0.1 to 10 wt %, a fraction of the mixture (B) used for preparing the polymer (b) is from 60 to 80 wt %, and a fraction of the mixture (C) used for preparing the polymer (b) is from 10 to 30 wt %, based in each case on a sum of individual amounts of the mixtures (A), (B) and (C).

8. The pigment paste as claimed in claim 1, wherein the mixture (A) comprises at least one monounsaturated ester of (meth)acrylic acid with an alkyl radical and at least one monoolefinically unsaturated monomer containing vinyl groups and having, arranged on the vinyl group, a radical which is aromatic or which is mixed saturated-aliphatic-aromatic, in which case aliphatic fractions of the radical are alkyl groups.

9. The pigment paste as claimed in claim 1, wherein the mixture (B) further comprises at least one monounsaturated ester of (meth)acrylic acid with an alkyl radical and at least one monoolefinically unsaturated monomer containing vinyl groups and having, arranged on the vinyl group, a radical which is aromatic or which is mixed saturated-aliphatic-aromatic, in which case aliphatic fractions of the radical are alkyl groups.

10. The pigment paste as claimed in claim 1, wherein the mixtures (A) and (B) contain no hydroxy-functional monomers and no acid-functional monomers.

11. The pigment paste as claimed in claim 1, wherein the mixture (C) comprises at least one alpha-beta unsaturated carboxylic acid, at least one monounsaturated ester of meth(acrylic) acid having an alkyl radical substituted by a hydroxyl group, and at least one monounsaturated ester of (meth)acrylic acid having an alkyl radical.

12. A method for dispersing color pigments within an aqueous pigment paste, the method comprising:
using a polymer having a particle size in a range from 100 to 500 nm, prepared by successive radical emulsion polymerization of three monomer mixtures (A), (B) and (C) of olefinically unsaturated monomers in water, wherein the mixtures (A), (B), and (C) are different from one another, and
wherein
the mixture (A) comprises at least 50 wt % of monomers having a solubility in water of less than 0.5 g/l at 25° C., and a polymer prepared from the mixture (A) possesses a glass transition temperature of 10 to 65° C.,
the mixture (B) comprises at least one polyunsaturated monomer, and a polymer prepared from the mixture (B) possesses a glass transition temperature of −35 to 15° C., and
a polymer prepared from the mixture (C) possesses a glass transition temperature of
−50 to 15° C.,
and wherein
in stage i. first the mixture (A) is polymerized,
in stage ii. then the mixture (B) is polymerized in the presence of the polymer prepared under stage i, and
in stage iii. thereafter the mixture (C) is polymerized in the presence of the polymer prepared under stage ii.

13. An aqueous basecoat material, wherein the basecoat material is prepared by admixing at least one pigment paste as claimed in claim 1 as component (1) to at least one aqueous component (2) which can be used for preparing a basecoat material and which comprises at least one polymer which can be used as binder, the polymer which can be used as binder comprising the polymer (b) also present in the pigment paste, and/or comprising at least one polymer different therefrom, wherein the basecoat material has improved long wave (LW) and distinctness of image (DOI) properties in a determination of a film thickness profile of the basecoat material as compared to film thickness profiles of otherwise similar basecoat materials.

14. A method for producing a multicoat paint system, the method comprising the stages of:
(1a) applying an aqueous basecoat material to a substrate,
(2a) forming a first polymer film from the aqueous basecoat material applied in stage (1a),
(1b) optionally applying a further aqueous basecoat material to the first polymer film thus formed,
(2b) optionally forming a second polymer film from the aqueous basecoat material applied in stage (1b),
(3) applying a clearcoat material to at least one of the first and second polymer films, and subsequently
(4) jointly curing the at least one of the first and second polymer films together with the clearcoat material,
wherein the basecoat material as claimed in claim 13 is used in stage (1a) or—if the method further comprises stages (1b) and (2b)—in stage (1a) and/or (1b).

15. The method as claimed in claim 12, wherein a metered addition of the olefinically unsaturated monomers in stages i. to iii. for preparing the polymer (b) takes place in such a way that in a reaction solution a fraction of free monomers does not exceed 6.0 wt %, based on a total amount of the monomers used in the respective polymerization stage, throughout a reaction time.

* * * * *